US008167685B2

(12) United States Patent
Sakaguchi et al.

(10) Patent No.: US 8,167,685 B2
(45) Date of Patent: May 1, 2012

(54) METHOD OF MANUFACTURING A PERPENDICULAR MAGNETIC RECORDING MEDIUM, A METHOD OF MANUFACTURING A SUBSTRATE FOR A PERPENDICULAR MAGNETIC RECORDING MEDIUM, AND A MEDIUM AND A SUBSTRATE MANUFACTURED BY THE METHODS

(75) Inventors: Shoji Sakaguchi, Matsumoto (JP);
Hiroyuki Nakamura, Matsumoto (JP);
Hideki Matsuo, Matsumoto (JP)

(73) Assignee: Fuji Electric Co., Ltd. (JP)

( * ) Notice: Subject to any disclaimer, the term of this patent is extended or adjusted under 35 U.S.C. 154(b) by 223 days.

(21) Appl. No.: 11/925,333

(22) Filed: Oct. 26, 2007

(65) Prior Publication Data
US 2008/0131737 A1 Jun. 5, 2008

(30) Foreign Application Priority Data
Oct. 27, 2006 (JP) ................. 2006-292757

(51) Int. Cl.
*B24B 1/00* (2006.01)
*G11B 5/62* (2006.01)
*G11B 7/24* (2006.01)
(52) U.S. Cl. .......... 451/37; 451/41; 428/846.2; 360/135
(58) Field of Classification Search ............... 438/690, 438/691, 693, 694; 51/307, 308, 309, 298, 51/299; 428/829, 846.9, 848.2, 848.6, 848.8, 428/846, 840, 64.1, 65.3, 65.2, 828, 163, 428/846.2; 451/28, 37, 41; 360/135; 216/88
See application file for complete search history.

(56) References Cited
U.S. PATENT DOCUMENTS
6,149,696 A * 11/2000 Jia .................................. 51/308
(Continued)

FOREIGN PATENT DOCUMENTS
JP 10-334460 A 12/1998
(Continued)

OTHER PUBLICATIONS
English machine translation Machida et al (JP 2003-173517) Jun. 2003.*
(Continued)

*Primary Examiner* — Kevin M. Bernatz
*Assistant Examiner* — Louis Falasco
(74) *Attorney, Agent, or Firm* — Rossi, Kimms & McDowell LLP

(57) ABSTRACT

A method of manufacturing a perpendicular magnetic recording medium and a substrate for the medium are disclosed, in which abnormal protrusions on an underlayer made of a Ni—P alloy are automatically eliminated while maintaining a flat surface with high accuracy on the underlayer, and appropriate texture traces remain to promote magnetization alignment in the vertical direction in a perpendicular magnetic recording medium without adversely affecting the magnetization alignment. In the method, texture processing is carried out on an underlayer made of a Ni—P alloy on a nonmagnetic base plate using a polishing tape while supplying mixed slurry of a surfactant and abrasive grains of polycrystalline diamond, and then, texture polishing is carried out on the underlayer processed by the texture processing, using a polishing tape while supplying slurry containing an abrasive material and an organic acid until the surface of the underlayer is polished to an arithmetic mean roughness Ra of at most 0.5 nm, preferably in the range of 0.05 nm to 0.2 nm.

11 Claims, 18 Drawing Sheets

U.S. PATENT DOCUMENTS

| | | | |
|---|---|---|---|
| 6,248,395 B1 | 6/2001 | Homola et al. | |
| 6,476,409 B2* | 11/2002 | Iwasaki et al. | 257/13 |
| 6,811,467 B1* | 11/2004 | Beresford et al. | 451/28 |
| 2003/0029095 A1* | 2/2003 | Ishitobi et al. | 51/307 |
| 2003/0077983 A1* | 4/2003 | Hagan et al. | 451/37 |
| 2003/0110710 A1* | 6/2003 | Oshima et al. | 51/307 |
| 2003/0110803 A1* | 6/2003 | Saito et al. | 65/30.14 |
| 2003/0135986 A1 | 7/2003 | Eschbach et al. | |
| 2003/0175556 A1* | 9/2003 | Sakawaki et al. | 428/829 |
| 2003/0203244 A1* | 10/2003 | Isono et al. | 428/846 |
| 2003/0211275 A1* | 11/2003 | Buitron et al. | 428/64.1 |
| 2004/0171269 A1* | 9/2004 | Kondo et al. | 438/694 |
| 2004/0180239 A1* | 9/2004 | Ikenishi et al. | 428/840 |
| 2004/0180611 A1* | 9/2004 | Tajima et al. | 451/41 |
| 2004/0209048 A1* | 10/2004 | Wang et al. | 428/163 |
| 2004/0241379 A1* | 12/2004 | Horie et al. | 428/65.3 |
| 2005/0214584 A1* | 9/2005 | Takahashi et al. | 428/828 |
| 2005/0248882 A1* | 11/2005 | Horie et al. | 360/135 |
| 2006/0151110 A1 | 7/2006 | Laursen et al. | |
| 2006/0175295 A1* | 8/2006 | Chu et al. | 216/88 |
| 2006/0204792 A1* | 9/2006 | Osawa | 428/829 |
| 2006/0216551 A1 | 9/2006 | Tanifuji et al. | |
| 2006/0228587 A1* | 10/2006 | Kuboki | 428/829 |
| 2007/0059935 A1* | 3/2007 | Kozasa et al. | 438/690 |

FOREIGN PATENT DOCUMENTS

| | | |
|---|---|---|
| JP | 2003-049159 A | 2/2003 |
| JP | 2003-173517 A | 6/2003 |
| JP | 2005-149603 A | 6/2005 |
| JP | 2005-216465 A | 8/2005 |
| JP | 2005-353177 A | 12/2005 |
| JP | 2006-268984 A | 10/2006 |
| WO | 2006/022444 A1 | 3/2006 |

OTHER PUBLICATIONS

English machine translation Kawada et al (JP 2005-353177) Dec. 2005.*

English machine translation Kawada et al (JP 2005-149603) Jun. 2005.*

English machine translation Kawiya et al (JP 2003-049159) Feb. 2003.*

English machine translation Kawada et al (JP 2005-216465) Aug. 2005.*

Search & Examination Report and Written Opinion conducted by Austrian Patent Office dated Apr. 14, 2009.

Notification of Reasons for Refusal issued in corresponding Japanese Patent Application No. 2006-292757 dated Mar. 30, 2010. Partial English translation provided.

* cited by examiner

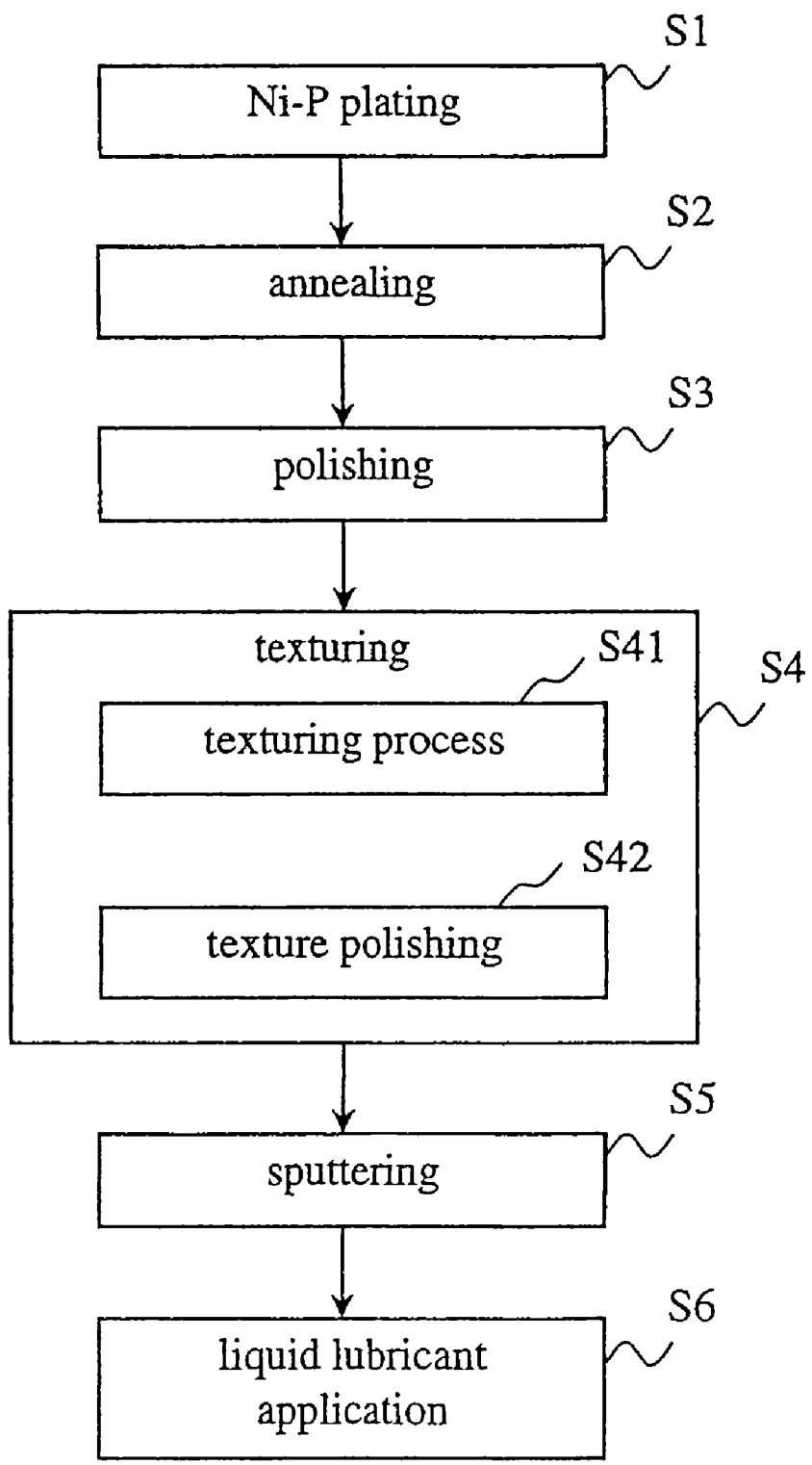

METHOD OF MANUFACTURING A PERPENDICULAR MAGNETIC RECORDING MEDIUM, A METHOD OF MANUFACTURING A SUBSTRATE FOR A PERPENDICULAR MAGNETIC RECORDING MEDIUM, AND A MEDIUM AND A SUBSTRATE MANUFACTURED BY THE METHODS

CROSS REFERENCE TO RELATED APPLICATIONS

This application is based on, and claims priority to, Japanese Patent Application No. 2006-292757, filed on Oct. 27, 2006, the contents of which are incorporated herein by reference in their entirety.

BACKGROUND OF THE INVENTION

A. Field of the Invention

The present invention relates to a method of manufacturing a perpendicular magnetic recording medium, a method of manufacturing a substrate for a perpendicular magnetic recording medium, and a medium and a substrate manufactured by the method.

B. Description of the Related Art

A perpendicular magnetic recording system has been practically applied to achieve high density magnetic recording medium in place of a conventional longitudinal magnetic recording system.

In a conventional longitudinal magnetic recording medium, texture processing is done to facilitate alignment of magnetization in circumferential direction and prevent a magnetic head from adhering to the surface of a magnetic recording medium. The texture processing gives fine streaks in the circumferential direction on a Ni—P plating layer of a nonmagnetic substrate. The texture processing is normally carried out by pressing a polishing tape against the rotating nonmagnetic substrate having a Ni—P plating layer while supplying a slurry of abrasive material.

In a perpendicular magnetic recording system, in which magnetization is aligned vertically, texture traces in the circumferential direction align magnetization in that direction and may inhibit the medium from achieving the low noise performance that is required by magnetic recording. It generally is known in a perpendicular magnetic recording system that higher accuracy in flatness of a substrate surface results in less magnetic noise and better vertical alignment of magnetization. Accordingly, it has been proposed in a series of steps of manufacturing a magnetic recording medium to implement a polishing step on the surface of a nonmagnetic substrate having a Ni—P plating layer composing a magnetic recording medium to achieve a flat surface with high accuracy, while omitting the texturing step in a circumferential direction, as disclosed in Japanese Unexamined Patent Application Publication No. 2005-216465 and 2005-149603, for example.

When the texturing step is omitted in the series of steps of manufacturing a magnetic recording medium, and the polishing step is carried out to obtain a flat surface with high accuracy on the surface of a nonmagnetic substrate having a Ni—P plating layer, the probability of contact increases between the magnetic head and the recording plane of the magnetic recording medium which leads to a degradation in reliability, because of the lack of the texturing step that would have prevented the magnetic head from adhering to the recording plane of the magnetic recording medium. Meanwhile, flying height of a magnetic head has decreased recently in conjunction with enhancement of recording density of a magnetic recording medium. A recording plane of such a magnetic recording medium may suffer from head crash due to abnormal protrusions that may be formed by the polishing step. The head crash damages the recording plane of the magnetic recording medium. On a recording plane of a magnetic recording medium of a perpendicular magnetic recording system that is not processed by texturing, minute protrusions may be formed, which do not lead to head crash, but cause various types of noises during read/write of information by the magnetic head.

Japanese Unexamined Patent Application Publication No. 2005-353177, for example, proposes a method for solving this problem and stabilizing the flying characteristic of a magnetic head. According to this document, after polishing the surface of a soft magnetic underlayer, fine streaks of irregularities are formed in the circumferential direction on the smoothed surface of the soft magnetic underlayer. In this method, fine streaks of irregularities in the radial direction are first formed on the surface of a nonmagnetic substrate composing a magnetic recording medium. Then, a soft magnetic underlayer is formed on this surface by an electroless plating method or the like. Next, the surface of the soft magnetic underlayer is smoothed by polishing. Subsequently on the smoothed surface of the soft magnetic underlayer, the fine streaks of irregularities are formed in the circumferential direction.

In a series of steps of manufacturing a conventional recording medium of a longitudinal magnetic recording system, the purposes of the texture processing include enhancing magnetization alignment in the circumferential direction and preventing a magnetic head from adhering to the surface of the magnetic recording medium. The texture processing for those purposes gives fine streaks in the circumferential direction on a Ni—P plating layer of the nonmagnetic substrate, as disclosed in Japanese Unexamined Patent Application Publication No. 2003-49159. The fine streaks in the circumferential direction are formed by pressing a polishing tape against the rotating nonmagnetic substrate having a Ni—P plating layer while supplying a slurry of abrasive material. If cases where the texture processing generates protrusions or burrs, a means for suppressing these faults has been proposed, which uses a slurry containing abrasive material, organic acid, and water. Japanese Unexamined Patent Application Publication No. 2003-173517 proposes a texture processing that polishes a nonmagnetic substrate, after polishing the substrate surface, using a foamed polyurethane tape and a slurry containing abrasive grains of colloidal silica (having a mean grain diameter in the range of 0.03 to 0.5 µm and a concentration in the range of 3 to 30 wt %) and an additive such as carboxylic acid.

In a series of steps of manufacturing a perpendicular magnetic recording medium, that is, a magnetic recording medium in a perpendicular magnetic recording system, when a polishing step is employed for smoothing the surface of the underlayer of Ni—P alloy without doing texture processing, and fine streaks of irregularities in the circumferential direction are formed on the smoothed surface of the underlayer, an additional step must be done to remove remaining particles (scraped dust), which are abnormal protrusions that can be formed in the polishing step. The polishing step, which leaves a random surface configuration, further involves problems in the flying of the magnetic head The present invention is directed to overcoming or at least reducing the effects of one or more of the problems set forth above.

SUMMARY OF THE INVENTION

In view of the above problems, it is an object of the present invention to provide a method of manufacturing a perpendicular magnetic recording medium and a method of manufacturing a substrate for a perpendicular magnetic recording medium, in which abnormal protrusions on an underlayer composed of a Ni—P alloy are automatically eliminated while assuring a flat surface with high accuracy on the underlayer, and appropriate texture traces are formed that do not produce an adverse effect on the magnetization alignment in the perpendicular magnetic recording medium and facilitate magnetization alignment in the vertical direction.

To achieve the above object, a method of manufacturing a perpendicular magnetic recording medium and a method of manufacturing a substrate for the medium comprises a texturing process in which a plurality of grooves are formed on an underlayer made of a Ni—P alloy of a substrate having the underlayer using a first polishing tape made of nonwoven fabric while supplying a first slurry containing a surfactant and a first abrasive material; and a step of texture polishing in which a surface of the underlayer processed by the texturing process is polished to such a surface roughness that leaves texture traces promoting magnetization alignment in a vertical direction, using a second polishing tape made of a porous material while supplying a second slurry containing an organic acid and a second abrasive material having a grain diameter smaller than a mean diameter of perforations of the second polishing tape.

A perpendicular magnetic recording medium and a substrate for the medium of the invention are manufactured by the methods as stated above.

As described above, in the method of manufacturing a perpendicular magnetic recording medium and in the method of manufacturing a substrate for a perpendicular magnetic recording medium according to the invention, a texture polishing is carried out in which the surface of the underlayer made of a Ni—P alloy that has been processed by a preceding step of texturing process is polished to such a surface roughness that leaves texture traces promoting magnetization alignment in the vertical direction, using a second polishing tape made of a porous material while supplying a second slurry containing an organic acid and a second abrasive material having a grain diameter smaller than a mean diameter of perforations of the second polishing tape. By virtue of this featured constitution of the invention, abnormal protrusions on the underlayer are automatically eliminated while maintaining a flat surface with a high accuracy on the underlayer, and appropriate texture traces remains to promote magnetization alignment in the vertical direction in a perpendicular magnetic recording medium without adversely affecting the magnetization alignment.

BRIEF DESCRIPTION OF THE DRAWINGS

The foregoing advantages and features of the invention will become apparent upon reference to the following detailed description and the accompanying drawings, of which:

FIG. 2 shows manufacturing steps in an embodiment of a method of manufacturing a perpendicular magnetic recording medium according to the invention;

FIGS. 11(A), 11(B), 11(C), and 11(D) are pictures of substrate surfaces taken by an atomic force microscope, wherein FIGS. 11(A), 11(B), and 11(C) are of embodiment examples processed by texture polishing for 5 sec, 10 sec, and 30 sec, respectively, and FIG. 11(D) is of a comparative example processed by texture processing only;

FIGS. 13(A) and 13(B) are pictures of surface configuration of substrates taken by an atomic force microscope, wherein FIG. 13(A) is of a comparative example processed by polishing poly, and FIG. 13(B) is of an embodiment example processed by D processing.

DETAILED DESCRIPTION OF SPECIFIC EMBODIMENTS

FIG. 2 shows a series of steps in a method of manufacturing a perpendicular magnetic recording medium of an embodiment according to the invention.

Figure 3A:
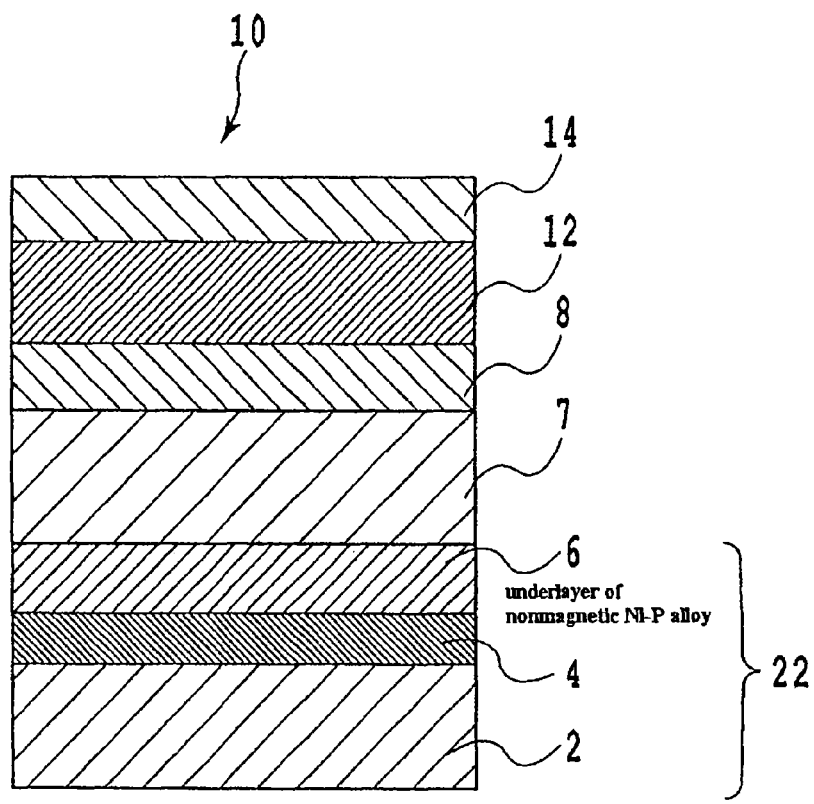
FIGS. 3(A) and 3(B) are partial sectional views showing different embodiments of a method of manufacturing a perpendicular magnetic recording medium according to the invention for the cases of a nonmagnetic underlayer of Ni—P alloy and a soft magnetic underlayer of Ni—P alloy, respectively.
Figure 3B:
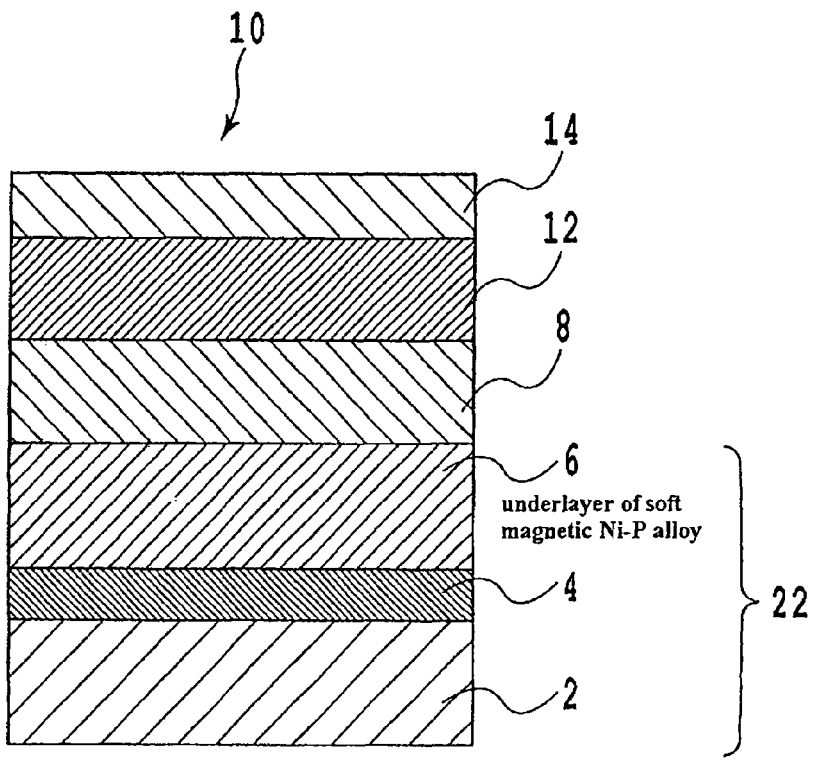

FIGS. 3(A) and 3(B) show perpendicular magnetic recording media manufactured by a method of the invention. FIG. 3(A) shows an embodiment with nonmagnetic underlayer 6 of Ni—P alloy and FIG. 3(B) shows an embodiment with soft magnetic underlayer 6. Perpendicular magnetic recording medium 10 manufactured by the series of steps shown in FIG. 2 comprises pretreatment layer 4, underlayer 6 made of a Ni—P alloy, soft magnetic backing layer 7 (in the case of FIG. 3(A)), nonmagnetic seed layer 8, perpendicular magnetic recording layer 12, and protective layer 14 sequentially laminated on the surface of nonmagnetic base plate 2.

Nonmagnetic base plate 2 is preferably a disk having a through hole in the center. An aspect of embodiment of a substrate for a perpendicular magnetic recording medium according to the invention is disk-shaped substrate 22 including nonmagnetic base plate 2 and underlayer 6 of Ni—P alloy provided on nonmagnetic base plate 2. FIGS. 3(A) and 3(B) schematically show a partial cross-section along the radial direction of perpendicular magnetic recording medium 10 composed of perpendicular magnetic recording layer 12 and other layers formed on substrate 22. Every layer over nonmagnetic base plate 2 can be formed similarly on the other side of the base plate, though not shown in the figures.

Nonmagnetic base plate 2 is made of a nonmagnetic material, for example, an aluminum alloy. Useful nonmagnetic materials other than the aluminum alloy include strengthened glass, crystallized glass, polycarbonate, polyolefin, and other plastic resins. Nonmagnetic base plate 2 can be manufactured from such plastic resins by injection molding.

Pretreatment layer 4 formed on the surface of nonmagnetic base plate 2 of aluminum alloy is a zinc film formed by dipping in zincate solution (a liquid containing zinc oxide and caustic soda solution). When a pretreatment layer is formed on a nonmagnetic base plate made of strengthened glass, crystallized glass, or plastics, it generally is treated for activation. In this process, palladium nuclei are precipitated on the surface of the base plate by sequentially dipping in tin chloride acidic solution with hydrochloric acid and palladium chloride acidic solution with hydrochloric acid. Physical evaporation techniques such as sputtering and ion plating can also be used to form a film of Ni, Ni—P, Cu, Cr, Fe, or Pd.

Underlayer 6 laminated on pretreatment layer 4 is composed of a nonmagnetic or soft magnetic N-P alloy and is laminated by principally an electroless plating method. An electroless plating layer of Ni—P alloy is substantially nonmagnetic in a phosphorus concentration higher than about 10 wt % and exhibits soft magnetic property in the lower phosphorus concentration. Underlayer 6 composed of a soft magnetic Ni—P alloy can be used as at least a part of a soft magnetic backing layer of a perpendicular magnetic recording medium as shown in FIG. 3(B). A structure is also possible in which a soft magnetic Ni—P alloy layer is provided on a nonmagnetic Ni—P layer. In that structure, the present invention can be applied to either one or both of the nonmagnetic Ni—P alloy layer and the soft magnetic Ni—P alloy layer. The Ni—P alloy layer is preferably laminated by an electroless plating technique to achieve mass production at a low cost. However, other general techniques for film deposition, including physical evaporation techniques such as sputtering and ion plating, also can be employed depending on required characteristics. In the present specification, substrate 22 is defined as a structure including nonmagnetic base plate 2 and underlayer 6 composed of a nonmagnetic or soft magnetic Ni—P alloy layer formed on base plate 2.

Nonmagnetic seed layer 8 is formed, on underlayer 6, of a material that favorably controls crystal alignment and grain size of perpendicular magnetic recording layer 12 that is described later. Preferable materials in the case of perpendicular magnetic recording layer 12 composed of a magnetization film of a lamination of cobalt alloy and platinum in particular include Ti, Ru, Re, Os and alloys of these elements.

Perpendicular magnetic recording layer 12 can be formed of any material that performs recording and reproduction in a perpendicular magnetic recording medium. The examples include cobalt alloy and platinum. Preferable materials are a material having a granular structure consisting of a CoCrPt alloy and an oxide of silicon or titanium, and a material having a lamination structure of multiple layers of cobalt layers and platinum or palladium layers.

Protective layer 14 can be a thin film of mainly carbon. On protective layer 14, a liquid lubricant layer (not shown in the figure) is preferably formed by applying a liquid lubricant such as perfluoropolyether.

Nonmagnetic seed layer 8, perpendicular magnetic recording layer 12, and protective layer 14 can be formed by any thin film formation method selected from a sputtering method, a CVD method, a vacuum evaporation method, a plating method and the like. In the case of underlayer 6 of a nonmagnetic Ni—P alloy, soft magnetic backing layer 7 (FIG. 3(A)) is preferably formed between underlayer 6 and nonmagnetic seed layer 8. Another nonmagnetic seed layer (composed of Pt, Pd, or Ta, for example) or a soft magnetic seed layer (composed of CoNiFe, for example) may be further provided (not shown in the figure) between underlayer 6 of Ni—P alloy and nonmagnetic seed layer 8 in the case without a soft magnetic backing layer (FIG. 3(B)), or between soft magnetic backing layer 7 and nonmagnetic seed layer 8 in the case with soft magnetic backing layer 7 (FIG. 3(A)). Additional layers can be provided between the layers described above as far as it does not adversely affect the performance of the existing layers. Japanese Unexamined Patent Application Publication No. 2006-120231, for example, discloses a favorable example of a perpendicular magnetic recording medium in detail, though the names and representation of the layers differ a little from those in the present specification.

Referring to FIG. 2, the process of manufacturing perpendicular magnetic recording medium 10 described above is principally comprised of a step of Ni—P plating S1, a step of annealing S2, a step of polishing S3, a step of texturing S4, a step of sputtering S5, and a step of liquid lubricant application S6. The step of texturing S4 is featured in the present invention and includes a step of texturing process S41 and a step of texture polishing S42. These steps will be described in the following.

The Step of Ni—P Plating S1

In the step of Ni—P plating S1, when nonmagnetic base plate 2 is an aluminum alloy base plate, the surface of nonmagnetic base plate 2 cut in a disk shape is first cleaned by alkali rinsing and acid etching. Cleaned nonmagnetic base plate 2 is then dipped in zincate solution, thereby forming pretreatment layer 4 of a zinc film having a predetermined thickness. In the case of nonmagnetic base plate 2 of glass or silicon, pretreatment layer 4 of an activation treatment layer is formed in which palladium nuclei are formed on the surface of the base plate by sequentially dipping in a tin chloride acidic solution with hydrochloric acid and a palladium chloride acidic solution with hydrochloric acid. Alternatively, a pretreatment layer 4 of Ni, Ni—P, Cu, Cr, Fe, or Pd is formed by means of a physical evaporation method such as a sputtering method or an ion plating method. Following this, underlayer 6 is formed on pretreatment layer 4 of nonmagnetic base plate 2 by Ni—P electroless plating.

Step of Annealing S2

In the step of annealing S2, a heat treatment is performed on nonmagnetic base plate 2 having underlayer 6, i.e., on substrate 22, at a temperature in a predetermined range and for a predetermined period.

Step of Polishing S3

Polishing processing is done on the surface of underlayer 6 to smooth the surface.

Step of Texturing S4

Step of Texturing Process S41

In the step of texturing process S41, texture processing is done on the surface of underlayer 6 of substrate 22. The texture processing is carried out using a texture processing apparatus shown in FIGS. 4, 5, and 6. Every phase of the texture processing is controlled by a control unit (not shown in the figures) for the texture processing apparatus.

The texture processing apparatus comprises: chuck mechanism 24 detachably holding substrate 22 that has a hole in the center and an underlayer formed thereon, rotary driving device 26 rotating chuck mechanism 24 together with substrate 22 connected to chuck mechanism 24, tape polishing mechanisms 28A and 28B that press a part of polishing tape 34 against both surfaces of substrate 22 that are to be polished and carry out polishing, tape polishing mechanism shifting devices 30A and 30B that bring tape polishing mechanisms 28A and 28B together or apart along the center line of chuck mechanism 24, oscillation device 32 that oscillates tape polishing mechanisms 28A and 28B simultaneously in the radial direction of substrate 22, and slurry supply sections 42A and 42B that supply slurry to the surface of substrate 22 to be processed.

Chuck mechanism 24 disposed along the common central axis with the through hole of substrate 22 holds substrate 22 so that the central axis crosses the flat surface of substrate 22 nearly at right angle. Rotary driving device 26 is a drive motor, for example, and rotates substrate 22 and chuck mechanism 24 at a rotating speed in the range of 50 to 500 rpm.

Tape polishing mechanisms 28A and 28B oppose each other with substrate 22 being interposed between them, and have the same structure. So, description is made of tape polishing mechanism 28A only, and a description of tape polishing mechanism 28 B is omitted.

Tape polishing mechanism 28A comprises feed roller 40c feeding polishing tape 34 (described later), wind roller 40b winding polishing tape 34, press roller 40a pressing a part of continuously fed polishing tape 34 against the surface of substrate 22 to be processed, and tension rollers 40d which provide tension force on the part of polishing tape 34 that hangs between press roller 40a and feed roller 40c and the part of polishing tape 34 that hangs between press roller 40a and wind roller 40b.

Polishing tape 34 is a nonwoven type processed fabric. The width of polishing tape 34 preferably covers the entire width in the radial direction of the surface of substrate 22 to be processed.

Wind roller 40b is connected to an output shaft of a drive motor (not shown in the figures). By operation of the drive motor, polishing tape 34 fed from feed roller 40c is moved in the direction of the arrows in FIG. 4 and, through press roller 40a, is wound continuously by wind roller 40b at a predetermined speed. As a result, a polishing tape 34 is continuously fed and wound on the outer peripheral surface of press roller 40a, and a fresh portion is continuously exposed to the surface of substrate 22 to be processed. Tape polishing mechanisms 28A and 28B are provided with slurry supply sections 42A and 42B, respectively, which supply slurry onto the surface of substrate 22 to be processed. The slurry is a mixture of a surfactant and abrasive grains of polycrystalline diamond, for example.

Slurry supply sections 42A and 42B are arranged in tape polishing mechanism 28A and 28B with the tips of the slurry supply sections opposing the surfaces of substrate 22 to be processed. Accordingly, slurry supply sections 42A and 42B are arranged opposite each other with substrate 22 therebetween, as shown in the enlarged drawing of FIG. 6. Slurry supply sections 42A and 42B are moved together by tape polishing mechanism 28A and 28B.

Figure 4:
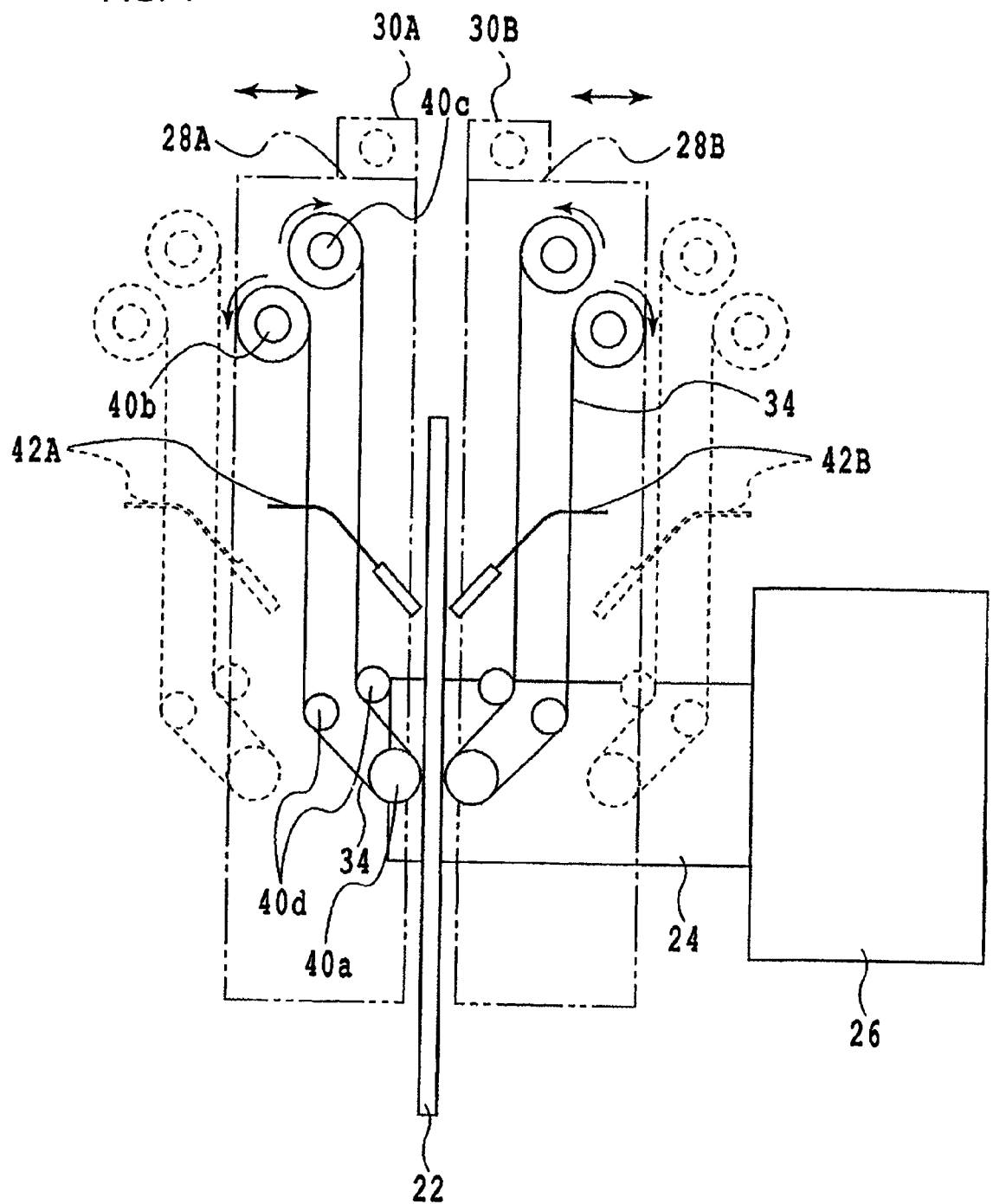
FIG. 4 shows a schematic construction of an essential part of a texture processing apparatus used in an embodiment of a method of manufacturing a perpendicular magnetic recording medium according to the invention.
Figure 5:
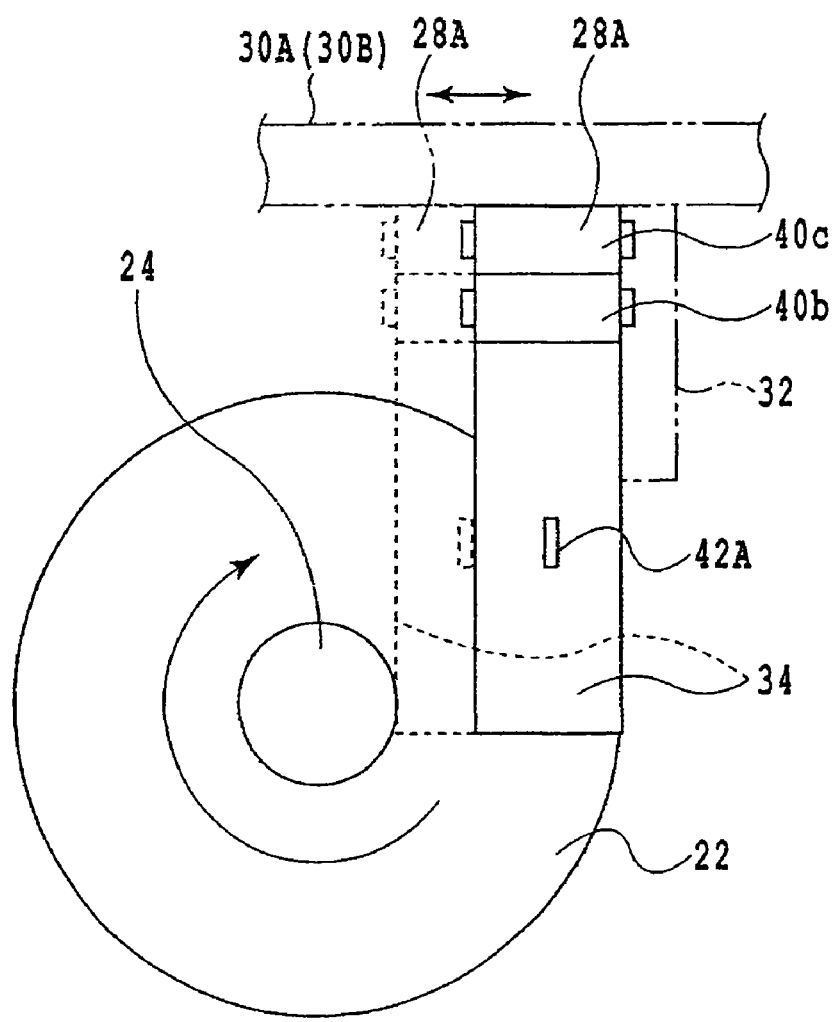
FIG. 5 is a side view of the texture processing apparatus shown in FIG. 4.
Figure 6:
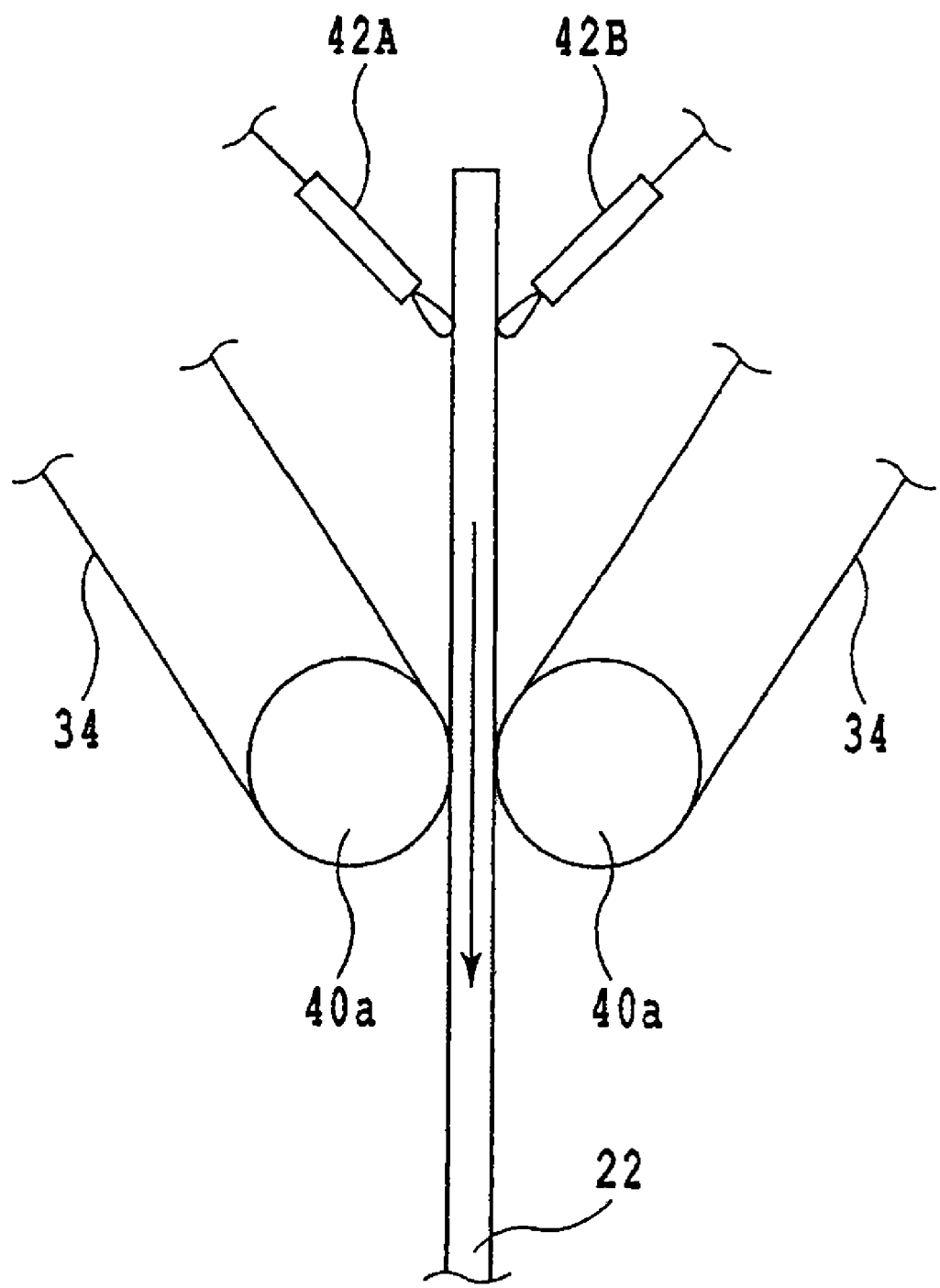
FIG. 6 illustrates operation of the texture processing apparatus shown in FIG. 4.

In texture processing, tape polishing mechanisms 28A and 28B are first moved from a waiting position separated from the surface of substrate 22 to be processed, as indicated by the two-dot chain line in FIG. 4, to the polish execution position indicated by the solid line in FIG. 4 along the center line of substrate 22 by tape polishing mechanism transfer devices 30A and 30B. Then, a part of polishing tape 34 is pressed to the surface of substrate 22 being processed as shown in enlarged drawing of FIG. 6 while substrate 22 is rotating in the direction of the arrow with the slurry being supplied from slurry supply sections 42A and 42B. At the same time, tape polishing mechanisms 28A and 28B are oscillated by oscillation device 32 as shown in FIG. 5 in the radial direction indicated by the double-headed arrow. In FIG. 5, the length of the double-headed arrow and the position of polishing tape 34 indicated by the dotted line are exaggerated for clear expression of the oscillation.

As a result, a predetermined multiplicity of grooves is formed in a nearly circumferential direction on underlayer 6 which is the surface of substrate 22 that is being processed. After completion of the texture processing on the whole processed surface of substrate 22, the slurry supply from slurry supply sections 42A and 42B is stopped.

Tape polishing mechanisms 28A and 28B cease operation and are returned to the waiting position in which they are separated from the processed surface of the substrate by tape polishing mechanism transfer devices 30A and 30B.

A Step of Texture Polishing S42

In the subsequent step of texture polishing S42 in FIG. 2, a processing of texture polishing is carried out for about 30 seconds on the surface of substrate 22 on which the step of texturing process S41 has been completed. The processing of texture polishing is carried out using the texture processing apparatus shown in FIG. 4 in which polishing tape 34 is replaced by polishing tape 36 which is described hereinafter.

Figure 1:
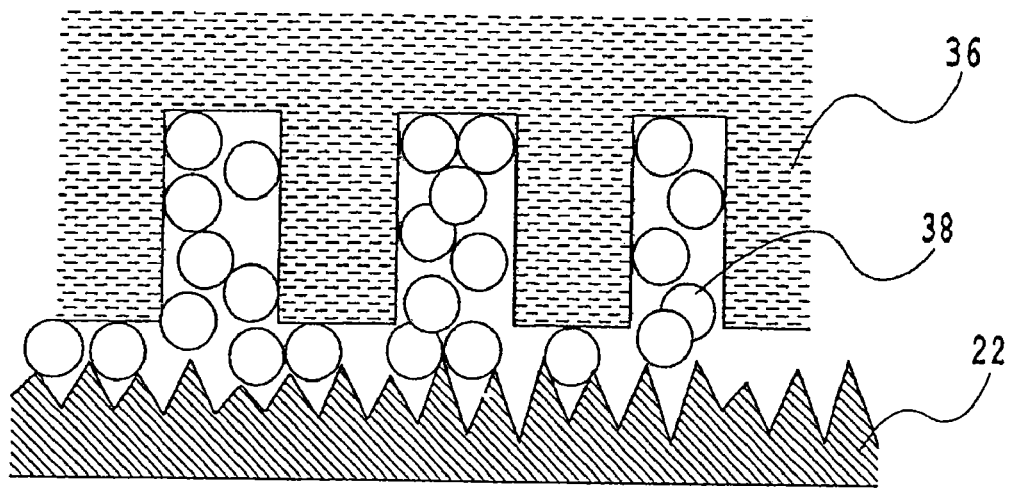
FIG. 1 is an enlarged partial sectional view showing a part of a polishing tape and a part of a substrate that are used in an embodiment of a method of manufacturing a perpendicular magnetic recording medium according to the invention.

Polishing tape 36 is made of a porous material, for example, a urethane foam pad, as shown in the enlarged view of FIG. 1. A mean diameter Da of perforations and a rate of perforations of the urethane foam pad are 40 μm and 25%, respectively. The width of polishing tape 36 preferably covers the entire width in the radial direction of the surface of substrate 22 to be processed.

Usable slurry contains at least abrasive material 38 and an organic acid. Abrasive material 38 is preferably single crystal or polycrystalline diamond or colloidal silica having a grain diameter smaller than the mean diameter Da of perforations of polishing tape 36. The organic acid is citric acid, for example. The organic acid can also be selected from maleic acid, malic acid, phosphoric acid, succinic acid, formic acid, a mixture of these acids, and a mixture of the mixed acid and a surfactant.

This processing of texture polishing forms an appropriate texture trace on the surface of underlayer 6 of substrate 22. A surface roughness (arithmetic mean roughness) Ra of the resulting underlayer 6 of substrate 22 should be no larger than 0.5 nm (5 Å), and more preferably is in a range of 0.05 nm to 0.2 nm.

A Step of Sputtering S5

Subsequently, after cleaning and drying (not shown in FIG. 2), the sputtering step S5 in FIG. 2 forms nonmagnetic seed layer 8, perpendicular magnetic recording layer 12, and protective layer 14 by sequentially laminating on the polished surface of underlayer 6 by means of a sputtering method, for example.

A Step of Liquid Lubricant Application S6

Finally, a liquid lubricant layer is applied and formed on protective layer 14 in the step of liquid lubricant application S6. Thus, perpendicular magnetic recording medium 10 is obtained.

Example 1

Manufacturing a Substrate

A disk of 3.5 inch diameter of an Al-5 wt % Mg alloy was prepared for nonmagnetic base plate 2. After cleaning the surface by alkali cleaning and acid etching, zincate (substitution zinc plating) was made for a pretreatment layer of electroless Ni—P plating. Then, a nonmagnetic underlayer of Ni—P alloy with a thickness of about 13 μm was formed using a commercially available electroless Ni—P plating solution for hard disk substrates (Nimuden HDX manufactured by C. Uyemura & Co., Ltd.) in a plating bath controlled at a Ni concentration of 6.0±0.1 g/L, pH 4.5+0.1, and liquid temperature 92±1° C. The average phosphorus concentration of the nonmagnetic Ni—P plating film was 12 wt %. Then, annealing was done at 250° C. for 30 minutes and polished to smooth the surface.

Then, texture processing was carried out according to the step of texturing process S41 as described previously using a polishing tape of nonwoven fabric of nylon with a width of about 4 cm and slurry containing about 0.1 wt % of polycrystalline diamond with a mean grain diameter of 0.05 μm and a coolant material. The conditions in the texture processing were a rotating speed of the disk substrate of 400 rpm, a press roller made of nitrile rubber with a hardness of 50 duro, and a pressure on the polishing tape of 1.5 kgf/cm². The winding speed of the polishing tape was 35 mm/min, the oscillation frequency was 5 Hz, oscillation amplitude was 1 mm, and the slurry supply rate was 20 mL/min. The time for the texture processing was 20 seconds for a disk including simultaneous processing on both front and back surfaces. Arithmetic mean roughness Ra was measured on the surface of the obtained disk substrate having texture traces, resulting in Ra of 0.15 nm.

Then processing of texture polishing was done on substrate 22 varying polishing time and type of slurry according to the step of texture polishing S42 as described previously to obtain several substrates 22. The conditions in the texture polishing were a rotating speed of the disk substrate of 400 rpm, a press roller made of nitrile rubber with a hardness of 50 duro, and a pressure on the polishing tape of 1.5 kgf/cm². The winding speed of the polishing tape was 35 mm/min, the oscillation frequency was 5 Hz, oscillation amplitude was 1 mm, and the slurry supply rate was 20 mL/min.

Evaluation 1: Surface Roughness of the Substrate (Ra Values Obtained by AFM)

Figure 7:
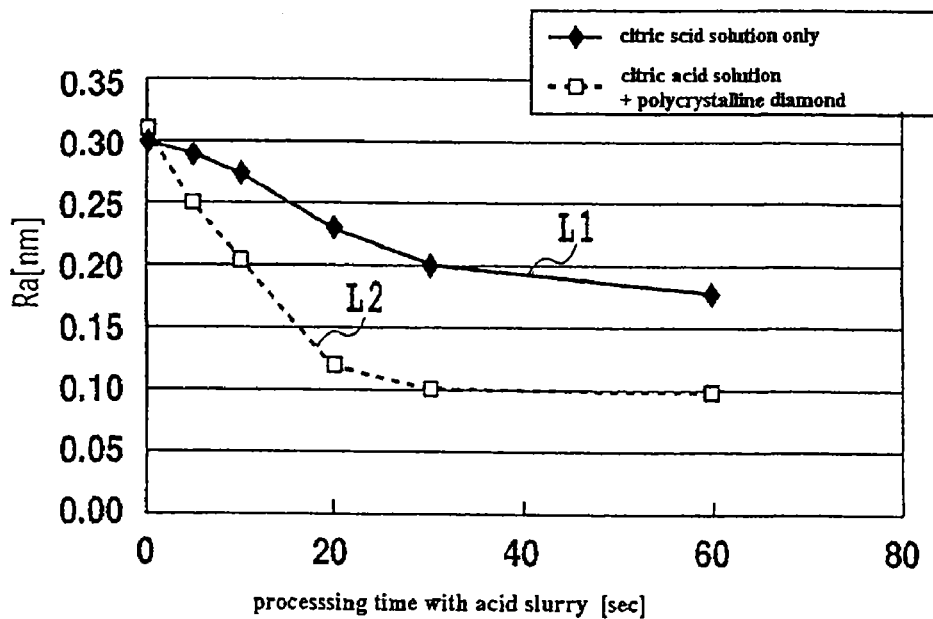
FIG. 7 shows relationship between surface roughness and processing time in substrates of comparative examples and embodiment examples.

FIG. 7 shows the experimental result. In FIG. 7, the ordinate represents the surface roughness (arithmetic mean roughness Ra), and the abscissa represents polishing time (seconds). The characteristic lines L1 and L2 show surface roughness on underlayer 6 of a nonmagnetic Ni—P alloy layer of substrates 22 processed by the texture polishing for various times using two types of slurry.

The characteristic line L1 was obtained on substrates 22 of comparative examples that were polished using slurry of citric acid (3% solution) only; the characteristic line L2 was obtained on substrates 22 of embodiment examples that were polished using slurry additionally containing 0.2 wt % of polycrystalline diamond (mean grain diameter of 0.05 μm) in the citric acid solution. The Ra values were obtained using results of surface configuration measurement by means of an atomic force microscope (AFM) over a surface area of 10 μm square and in conformity with the arithmetic mean roughness Ra specified in Japanese Industrial Standards JIS B0601.

As shown by the characteristic line L1 and the characteristic line L2 in FIG. 7, the arithmetic mean roughness Ra (nm) saturates at a processing time (polishing time) of about 30 seconds in the both cases. The arithmetic mean roughness Ra has been reduced twice the more effectively in the characteristic line L2 than in the characteristic line L1 from the texture roughness before the step of texture polishing.

Manufacturing Perpendicular Magnetic Recording Media

Perpendicular magnetic recording media 10 as shown in FIG. 3(A) were manufactured by forming perpendicular magnetic recording layer 12 and other layers on various types of disk substrates 22 on which the steps up to the step of texture polishing S42 have been carried out. (The layers except for the substrates were the same as those of "Example 1" in Japanese Unexamined Patent Application Publication No. 2006-120231.)

Substrate 22 after completion of the steps up to texture polishing S42 was cleaned and dried, and introduced into a sputtering apparatus, and a CoZrNb amorphous soft magnetic backing layer 7 was deposited to a thickness of 160 nm using a target of Co3Zr5Nb (the numeral represents content of the element after the numeral in at %; representing 3 at % of zirconium, 5 at % of niobium, and the remainder of cobalt; applicable hereinafter). Then, a CoNiFe soft magnetic seed layer 6 nm thick (not shown in the figure) was deposited using a target of Co35Ni4Fe. Subsequently, a Ru nonmagnetic seed layer 8 was deposited to a thickness of 10 nm using a Ru target under an argon gas pressure of 4.0 Pa. Subsequently, perpendicular magnetic recording layer 12 of CoCrPt—SiO$_2$ 10 nm thick was deposited under a gas pressure of 5.3 Pa using a target of 90 mol % (Co12Cr14Pt)—10 mol % (SiO$_2$). Finally, protective layer 14 of carbon 7 nm thick was deposited using a target of carbon, and extracted from the vacuum chamber. Deposition of the layers except for the Ru nonmagnetic seed layer 8 and the perpendicular magnetic recording layer 12 of CoCrPt—SiO$_2$ was carried out under an argon gas pressure of 0.67 Pa. Perpendicular magnetic recording layer 12 of CoCrPt—SiO$_2$ was formed by means of an RF magnetron sputtering method; and other layers were formed by means of a DC magnetron sputtering method. After that, a liquid lubricant layer 2 nm thick was formed of perfluoropolyether by a dipping method. Thus, perpendicular magnetic recording medium 10 was manufactured.

Evaluation 2: Noise Performance of Magnetic Recording Media

Figure 8:
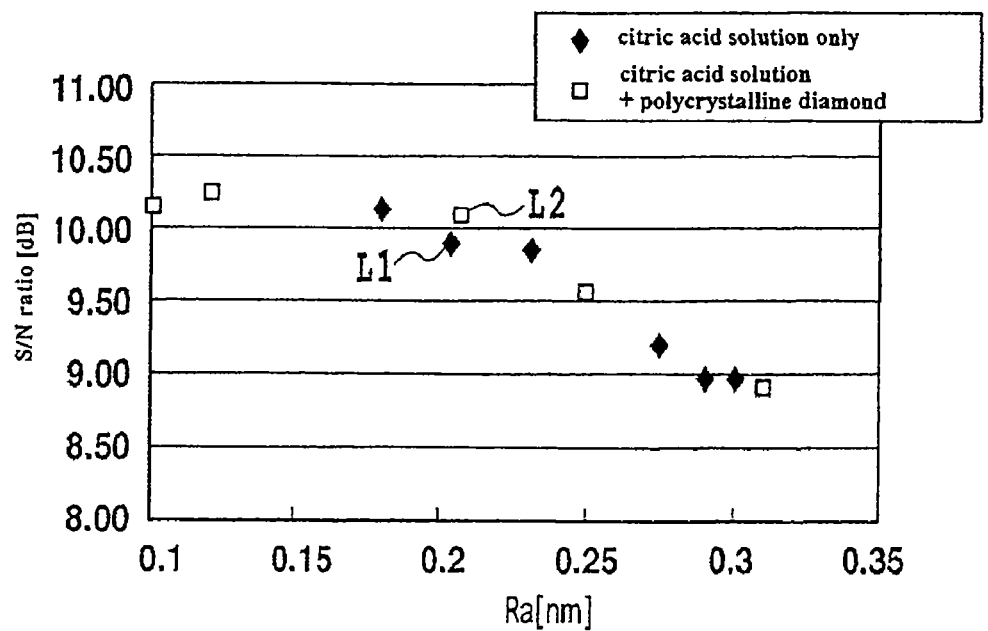
FIG. 8 shows relationship between noise performance and surface roughness of a substrate in perpendicular magnetic recording media of comparative examples and embodiment examples.

FIG. 8 shows results of comparative experiments on perpendicular magnetic recording media 10 studied by the inventors. FIG. 8 shows noise performance of perpendicular magnetic recording media 10 using substrates 22 that were polished with the types of slurry mentioned previously. In FIG. 8, the ordinate represents the noise performance (S/N ratio [dB]) and the abscissa represents arithmetic mean roughness Ra after processing of texture polishing on substrate 22. The graph L1 consists of measured values on the substrates of comparative examples that were polished with a slurry of citric acid (3% solution) only, and the graph L2 is for substrates 22 of embodiment examples that were polished using slurry additionally containing 0.2 wt % of polycrystalline diamond (mean grain diameter of 0.05 μm) in the citric acid solution. The noise performance (S/N ratio [dB]) was measured by a noise measuring instrument (RWA2002 manufactured by Guzik Technical Enterprises Corporation).

As is apparent from the graph L1 and graph L2 in FIG. 8, the noise performance correlates with the arithmetic mean roughness Ra after the processing of texture polishing; reduction of the arithmetic mean roughness Ra improves the noise performance. As is apparent from FIGS. 7 and 8, it has been confirmed, for the case of processing of texture polishing using an acid, that the addition of abrasive grains of diamond achieves mirror finish more efficiently and brings about aimed performance in a shorter time.

Example 2

A comparative study was done by the inventors on the effect of the type of slurry replacing the slurry of a citric solution containing 0.2 wt % of polycrystalline diamond (having a mean grain diameter of 0.05 μm) by a slurry containing colloidal silica in place of the polycrystalline diamond.

The abrasive grains of colloidal silica used in the replacement slurry were a mixture of a colloidal silica with a grain diameter of 40 nm and a colloidal silica with a grain diameter of 10 nm in the proportion of 80% to 20%. Acid in the slurry was maleic acid. Other conditions were the same as in the example of FIG. 7.

Substrates 22 studied in this experiment were subjected to four types of different processing: A, B, C, and D processing. The A processing includes a conventional longitudinal texturing processing done twice, which uses a nonwoven fabric and a slurry containing cluster diamond and a coolant material. The B processing includes the conventional longitudinal texture processing performed once and a following polishing processing using polishing tape 36 (of the urethane foam pad), abrasive grains of minute polycrystalline diamond, and a coolant material for slurry. The C processing includes the conventional longitudinal texture processing once and a following polishing processing using polishing tape 36, the abrasive grains of minute polycrystalline diamond, and the slurry using 3% citric acid. The D processing includes the conventional longitudinal texture processing once followed by twice polishing using polishing tape 36, the abrasive grains of colloidal silica, and the slurry using 3% citric acid, the processing being carried out by means of the texture processing apparatus.

It has been confirmed in the study by the inventors that the A processing, which is a comparative example, generated a surface configuration having large arithmetic mean roughness Ra and sharp texture traces, which are not suited for perpendicular magnetic recording media but are suited for longitudinal (in-plane) magnetic recording media. The B processing, which is a comparative example, has also been confirmed to generate a surface configuration having rather low arithmetic mean roughness Ra, but leaving sharp texture traces, which tends to produce in-plane alignment of magnetization.

The C processing and the D processing, which are embodiment examples according to the invention, have been confirmed to produce a surface configuration achieving a low arithmetic mean roughness Ra and eliminating a sharp texture trace, and thus are favorable for perpendicular magnetic recording media.

FIGS. 14(A), 14(B), 14(C), and 13(B) show surface roughness Ra (nm) obtained by measuring the surface roughness by means of an atomic force microscope (AFM) in a square area of 1×1 (μm) on a surface of the substrates 22 processed by the A processing, B processing, C processing, and D processing, respectively.

Figure 13A:
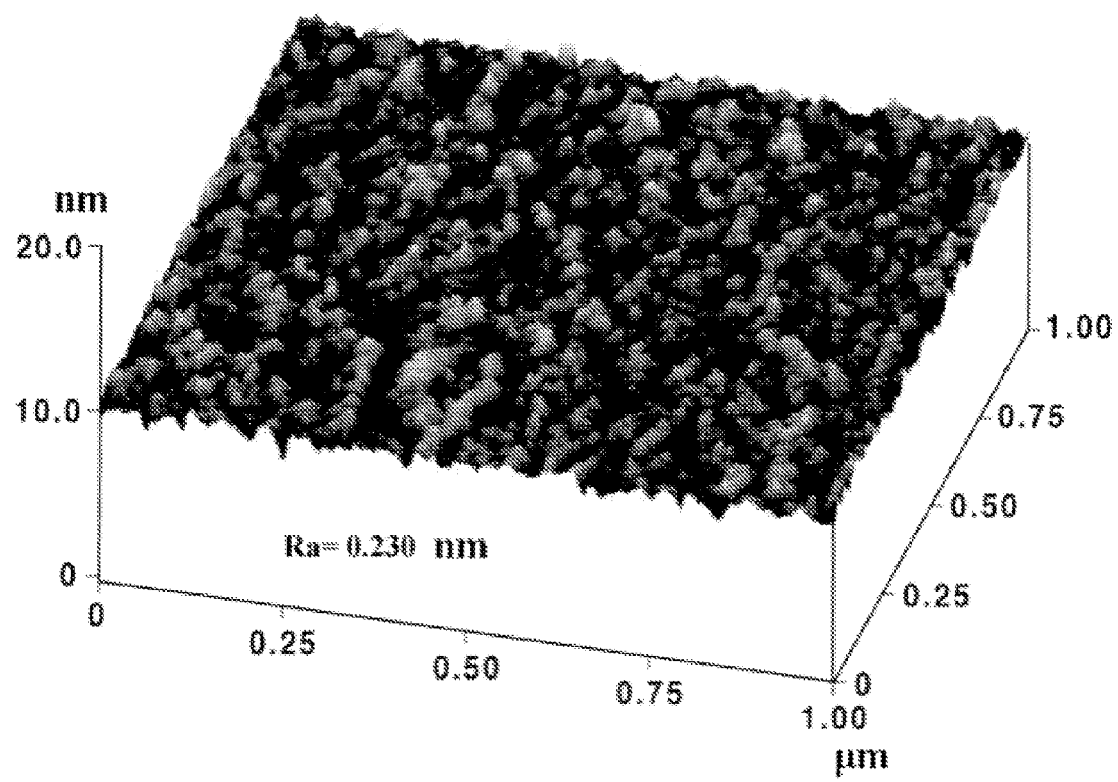
Figure 13B:
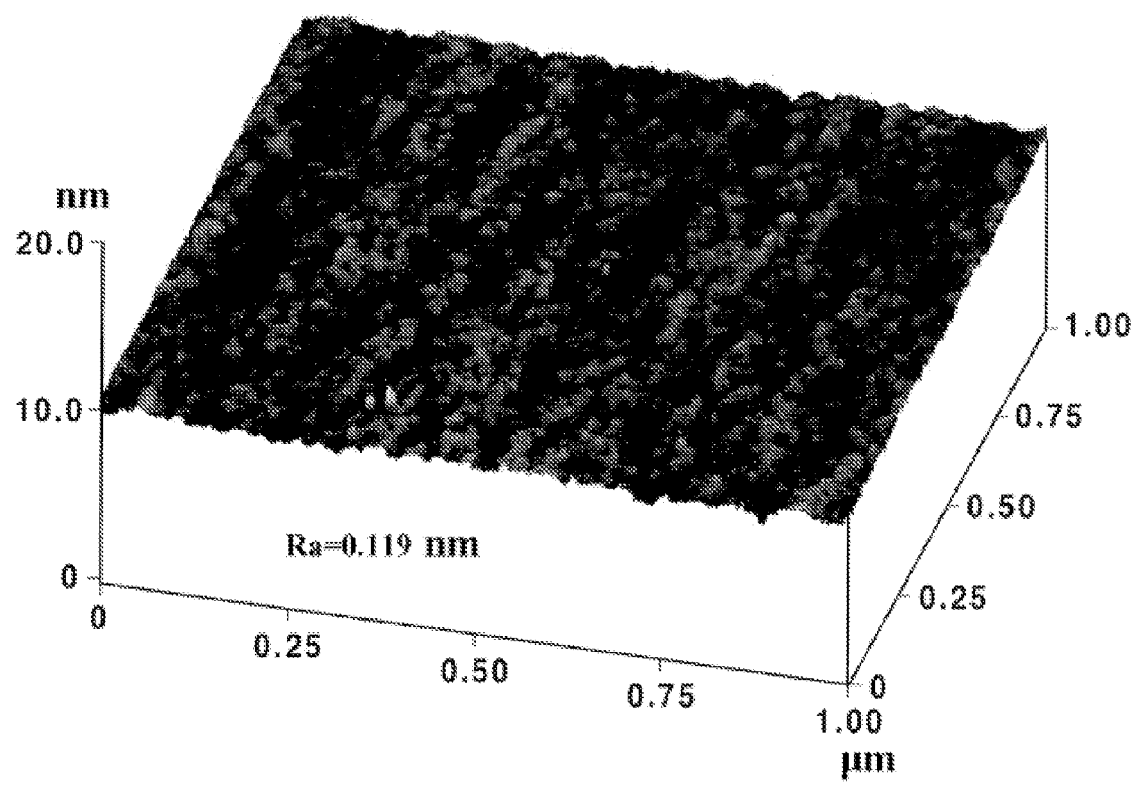
Figure 14A:
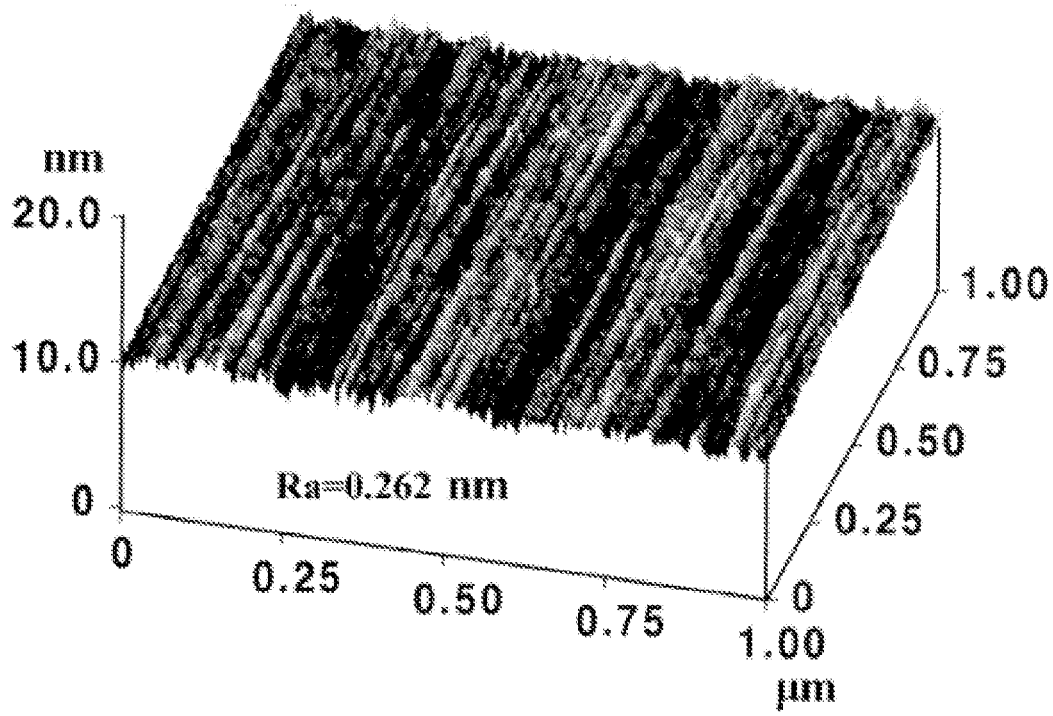
FIGS. 14(A), 14(B), and 14(C) are pictures of surface configuration of substrates take by an atomic force microscope in comparative and embodiment examples processed by A processing, B processing, and C processing, respectively.
Figure 14B:
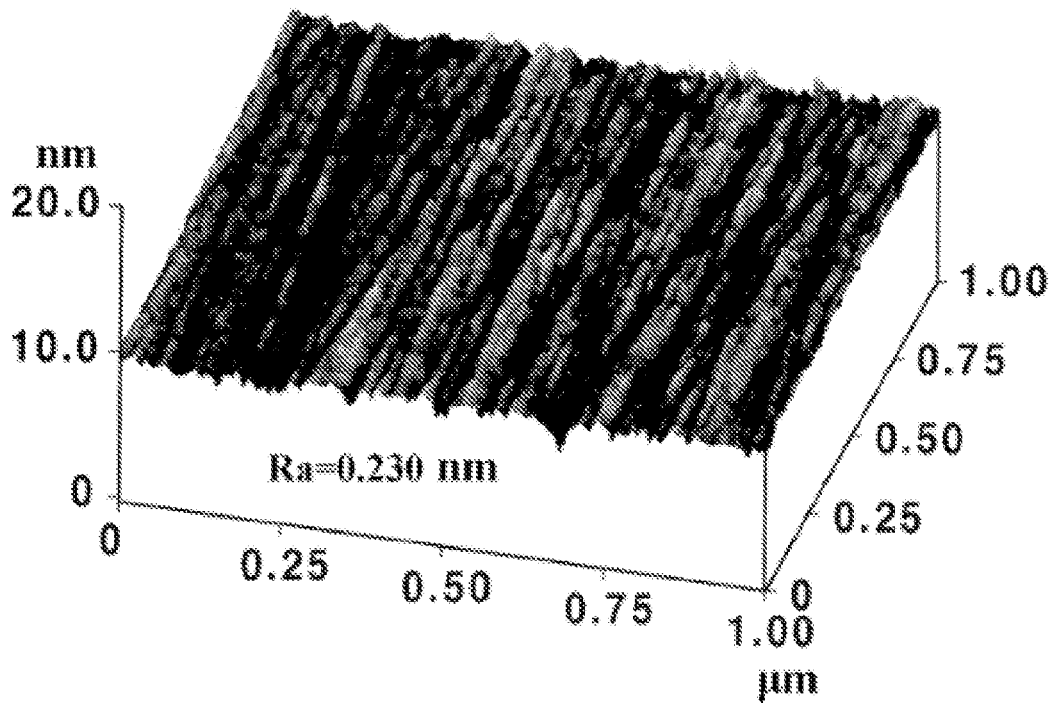
Figure 14C:
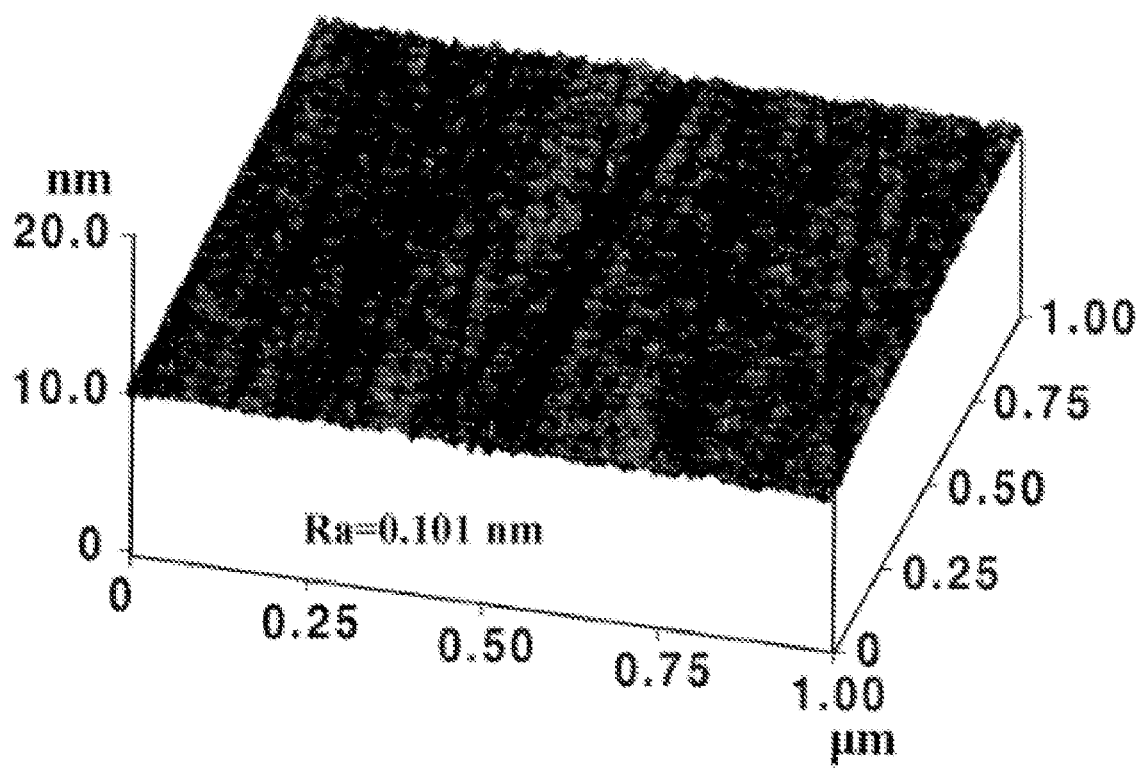

FIG. 14(A) shows a surface roughness of substrate 22 of a comparative example processed by the A processing; FIG. 14(B) shows a surface roughness of substrate 22 of a comparative example processed by the B processing; FIG. 14(C) shows a surface roughness of substrate 22 of an embodiment example processed by C processing; and FIG. 13(B) shows a surface roughness of substrate 22 of an embodiment example processed by D processing. FIG. 13(A) shows a surface roughness (arithmetic mean roughness Ra: 0.230 (nm)) of substrate 22 of a comparative example processed by polishing only.

The values of arithmetic mean roughness Ra were 0.262 nm and 0.230 nm in substrates 22 of comparative examples processed by A processing (shown in FIGS. 14(A)) and B processing (shown in FIG. 14(B)), respectively. These values are larger than 0.2 nm and are rather large values. Employing the C processing and the D processing, in contrast, the values of arithmetic mean roughness Ra were 0.101 nm and 0.119 nm in substrates 22 of embodiment examples shown in FIG. 14(C) and FIG. 13(B), respectively. These values are a little larger than 0.1 nm and are significantly small values, exhibiting a surface configuration of a substrate that is appropriate for perpendicular magnetic recording media. It has been therefore demonstrated that the mirror finishing of a substrate surface is possible using abrasive grains of colloidal silica similarly to or even better than the abrasive grains of diamond.

Evaluation 3: Surface Roughness of Substrates (AFM Observation)

Figure 11A:
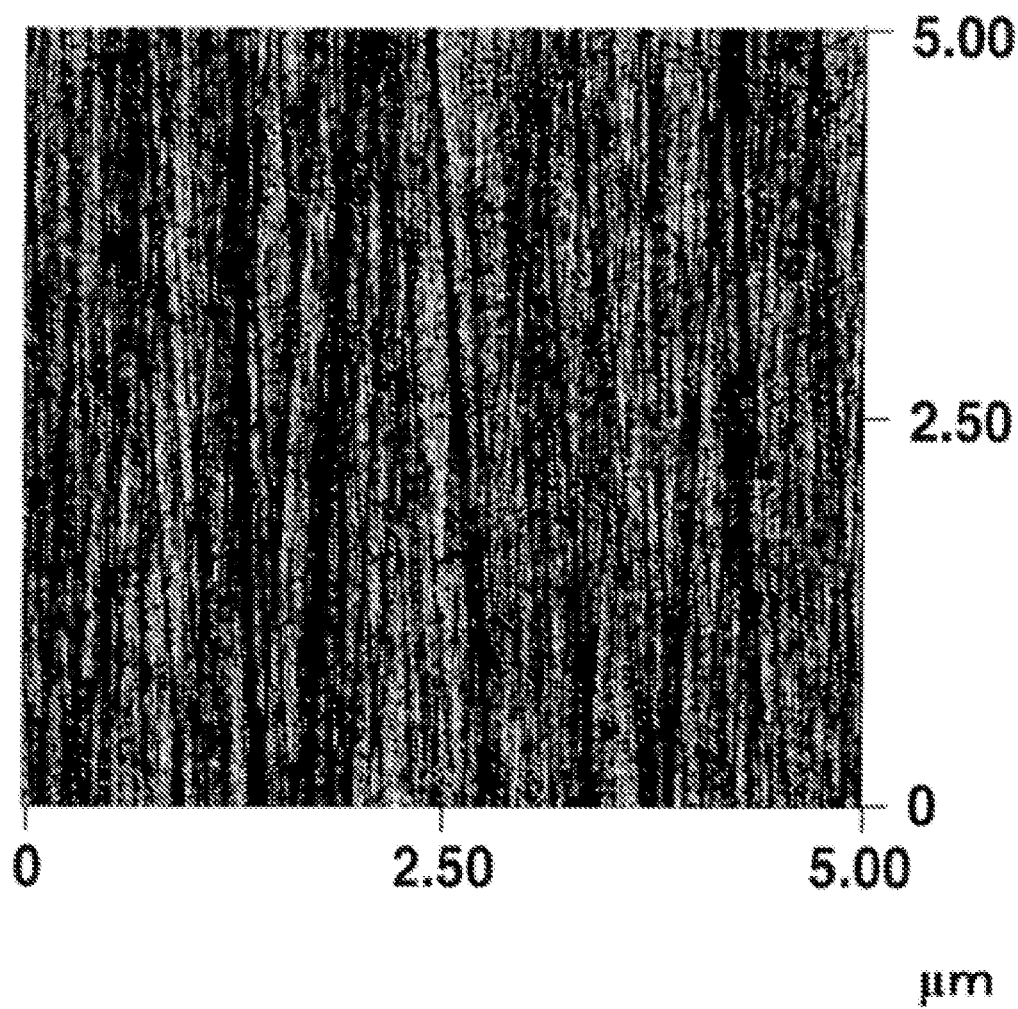
Figure 11B:
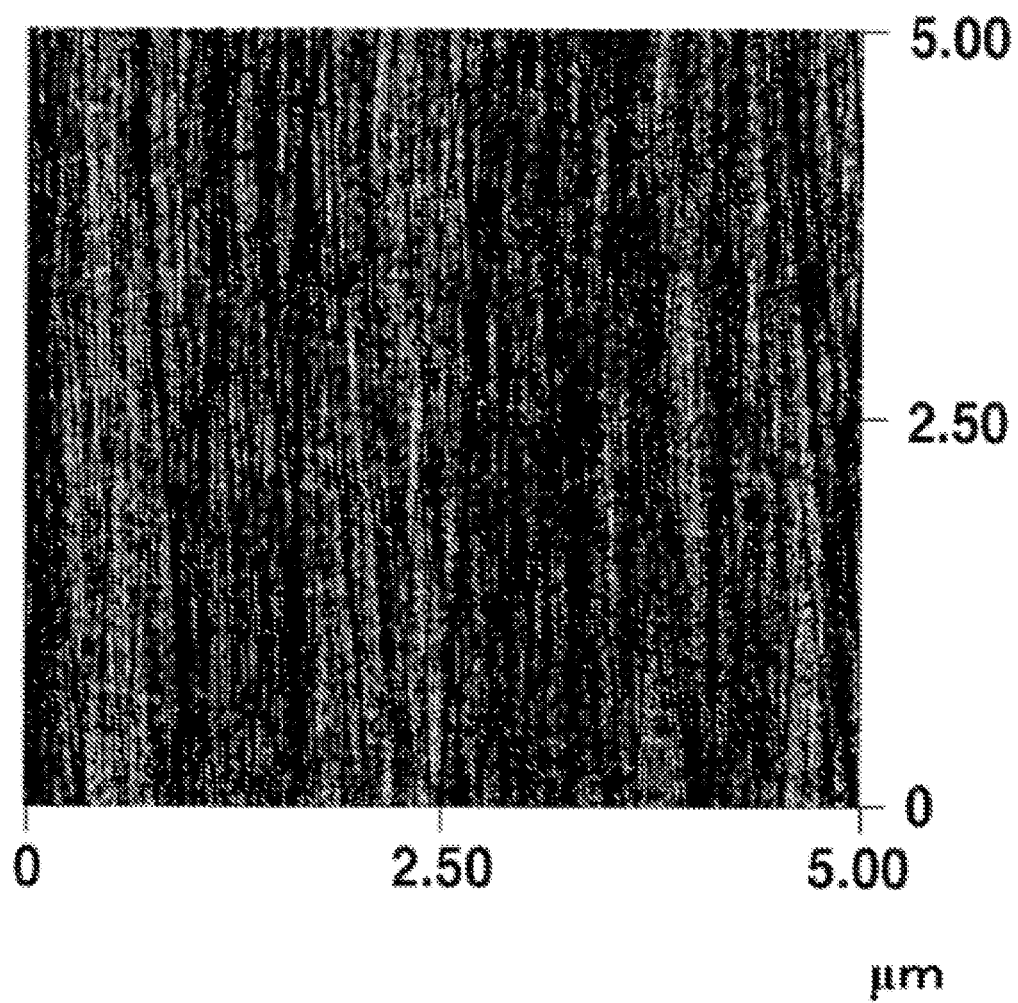
Figure 11C:
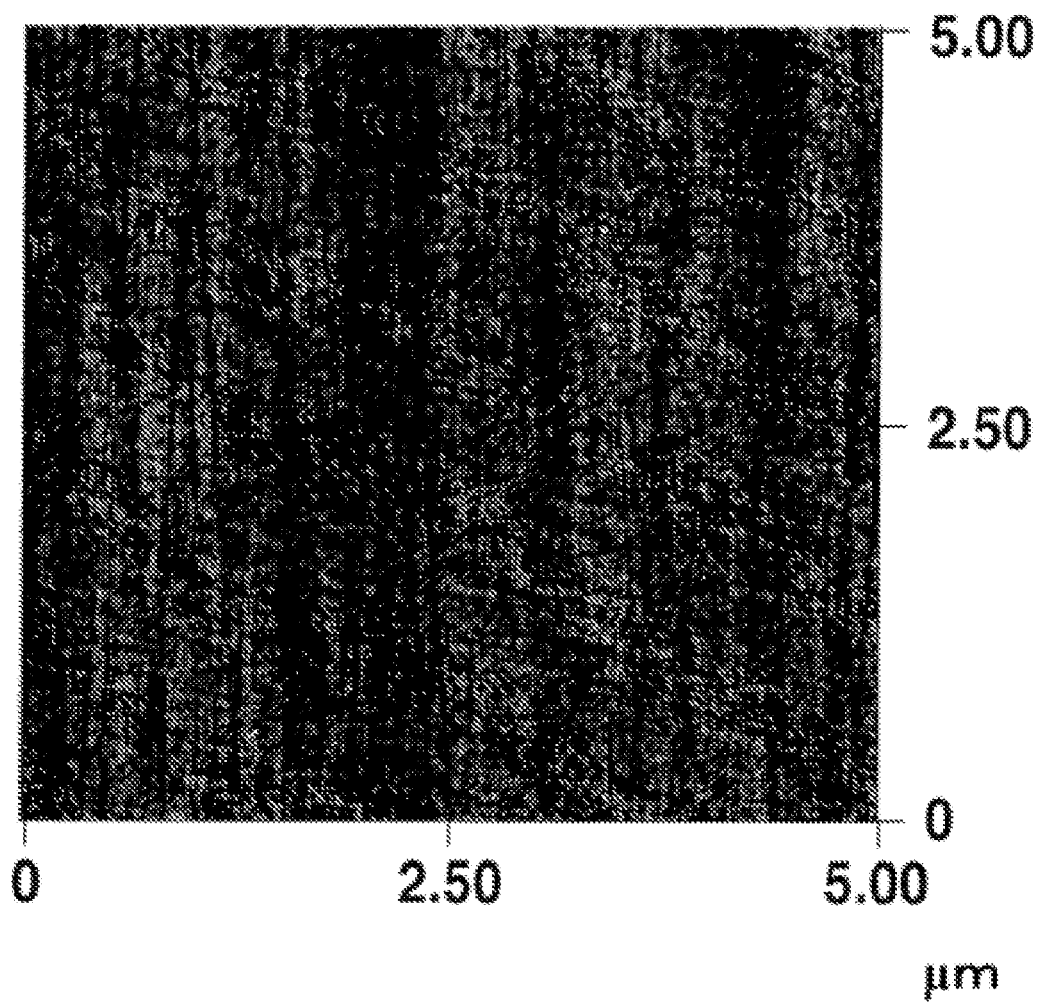
Figure 11D:
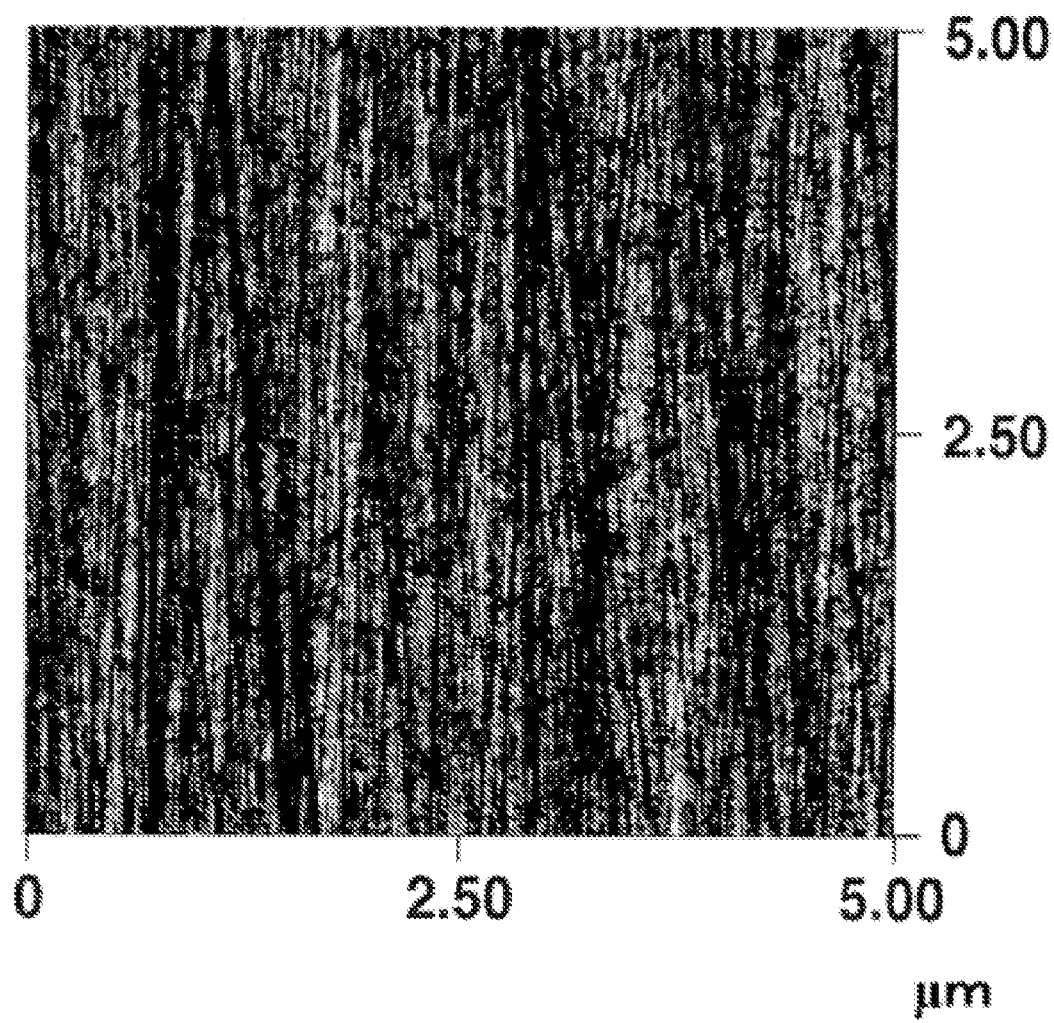
Figure 12A:
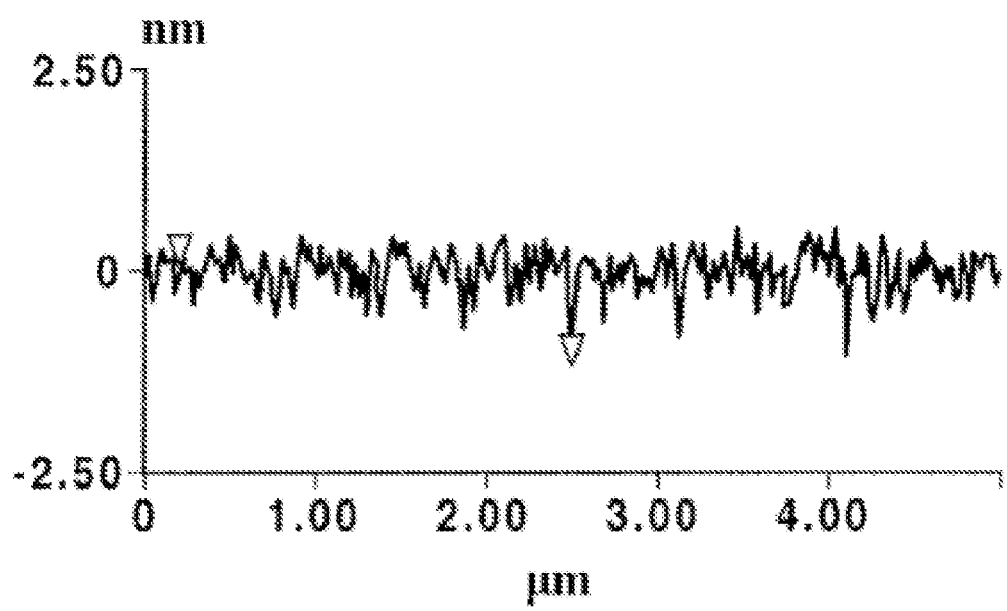
FIGS. 12(A), 12(B), 12(C), and 12(D) show surface roughness data corresponding to FIGS. 11(A), 11(B), 11(C), and 11(D), respectively.
Figure 12B:
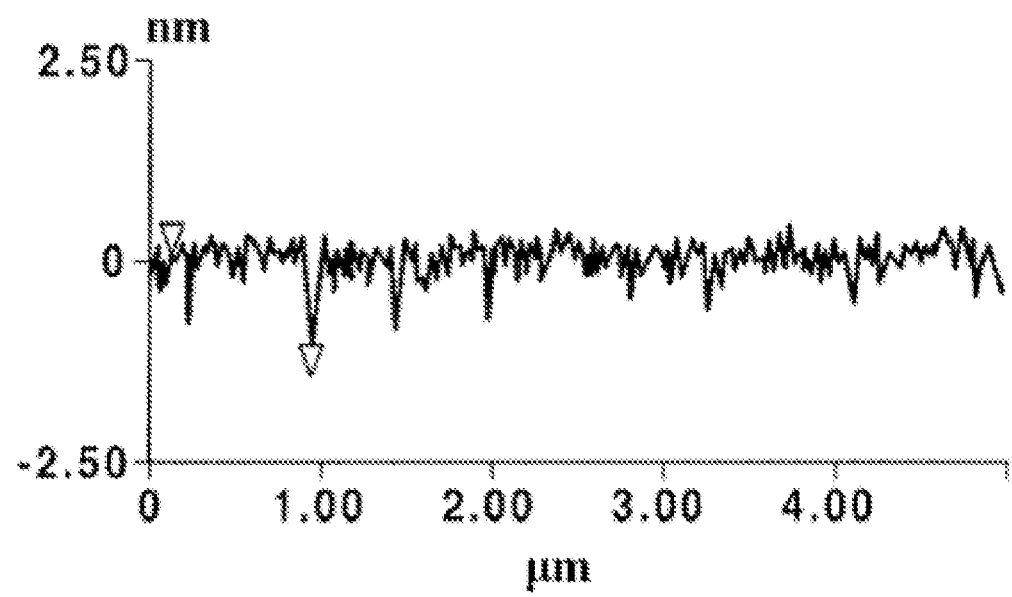
Figure 12C:
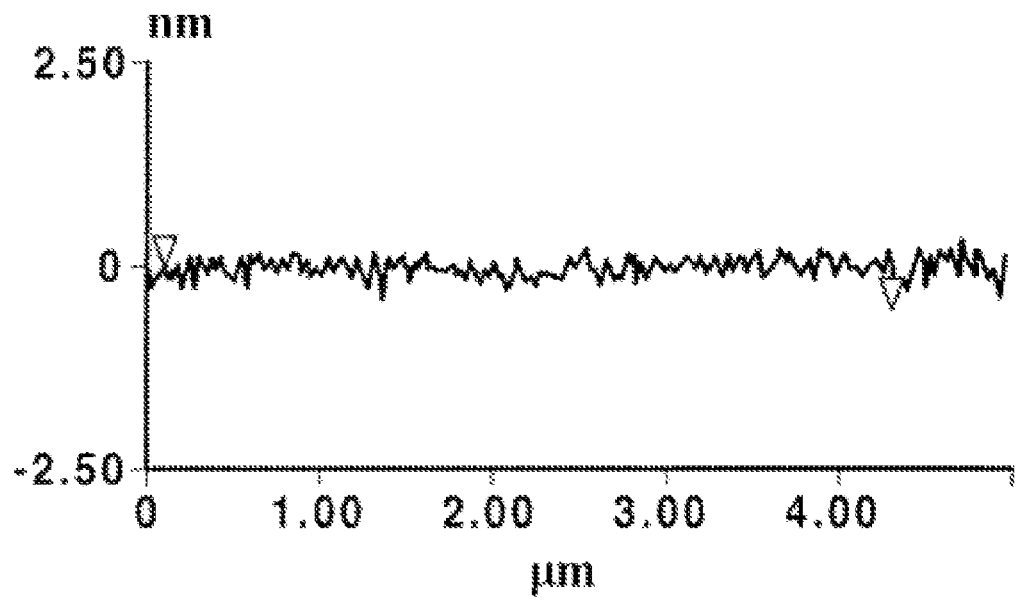
Figure 12D:
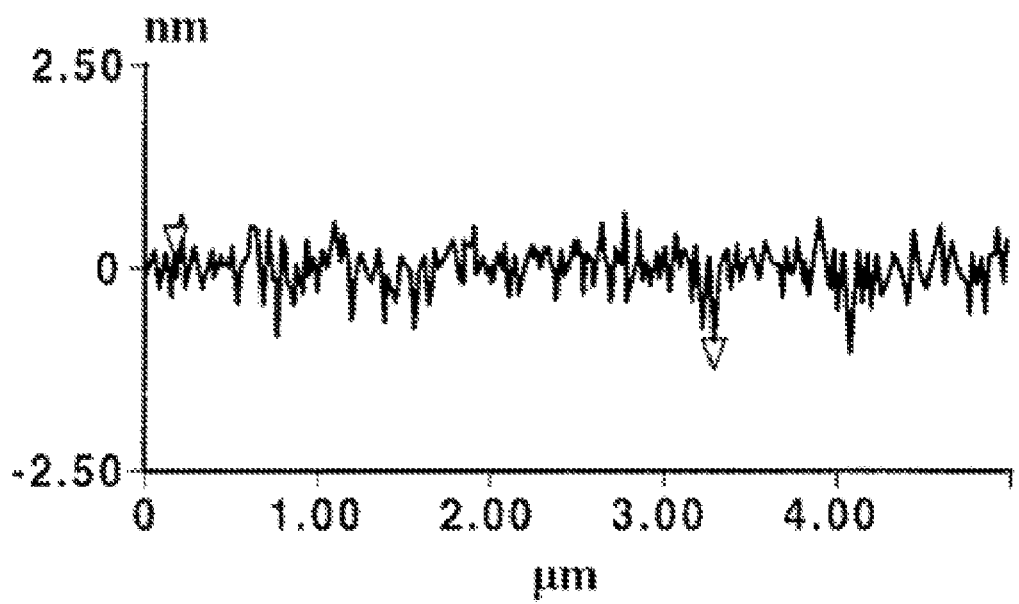

FIGS. 11(A), 11(B), 11(C) and FIGS. 12(A), 12(B), 12(C) show results of the studies by the inventors about the effects of processing time of the texture polishing on the surface roughness on substrates 22. FIGS. 11(A), 11(B), and 11(C) are pictures taken by an atomic force microscope on the surface of the substrates 22 of embodiment examples obtained after the texture polishing for processing time of 5 seconds, 10 seconds, and 30 seconds, respectively. FIGS. 12(A), 12(B), and 12(C) show the data of surface roughness obtained on the respective substrates. FIGS. 11(D) and 12(D) show an AFM picture and a surface roughness data, respectively, on the surface of substrate 22 of a comparative example processed by the texture processing only.

As is apparent from FIGS. 11(A), 11(B), 11(C) and FIGS. 12(A), 12(B), 12(C), the step of texture polishing S42 has eliminated flaws on the surface of Ni—P plating layer (underlayer) 6. The texture traces in the circumferential direction can be left in an appropriate degree even after the step of texture polishing using an acid and a urethane foam pad as described previously. Thus, a surface configuration has been obtained having slight remnant texture traces. It has been confirmed by the inventor that the arithmetic mean roughness Ra of the surface configuration on the substrate can be adjusted by controlling the processing time of the step of texture polishing.

Evaluation 4: Evaluation of Touch-Down Height of a Perpendicular Magnetic Recording Medium Touch-down height is used in some cases for evaluating a recording density of a magnetic recording medium and presence of abnormal protrusions on a substrate surface. Touch-down height is a height at which a test head first comes in contact with the magnetic recording medium when the rotating speed of the medium is gradually decreased while the test head flies over the medium.

Touch-down height was measured by a testing machine (RQ7800 manufactured by Hitachi DECO Company). The testing machine has a collision signal generator that is attached on the test head and generates a voltage on collision with the test piece. The test head is set at a predetermined radial position of the magnetic recording medium. Variation of the voltage is measured during the rotating speed of the medium is gradually decreased. The flying height of the magnetic head has been measured in advance as a function of the rotating speed of the medium by an instrument for measuring a flying height of the test head. Consequently, the flying height of the test head can be obtained from a rotating speed value.

Concerning the relationship between the flying height of a magnetic head and the recording density of a magnetic recording medium, a relationship is applicable that the higher recording density needs the lower flying height of a magnetic head. Accordingly, a recording density can be evaluated by measuring the touch-down height as described above. It can be considered that the lower touch-down height means possibility of the higher recording density.

When the abnormal protrusions such as particles are present on the substrate surface, the touch-down height is high because of collision of the abnormal protrusions on the test head. Therefore, presence of abnormal protrusions can also be evaluated by measuring touch-down height.

Figure 9:
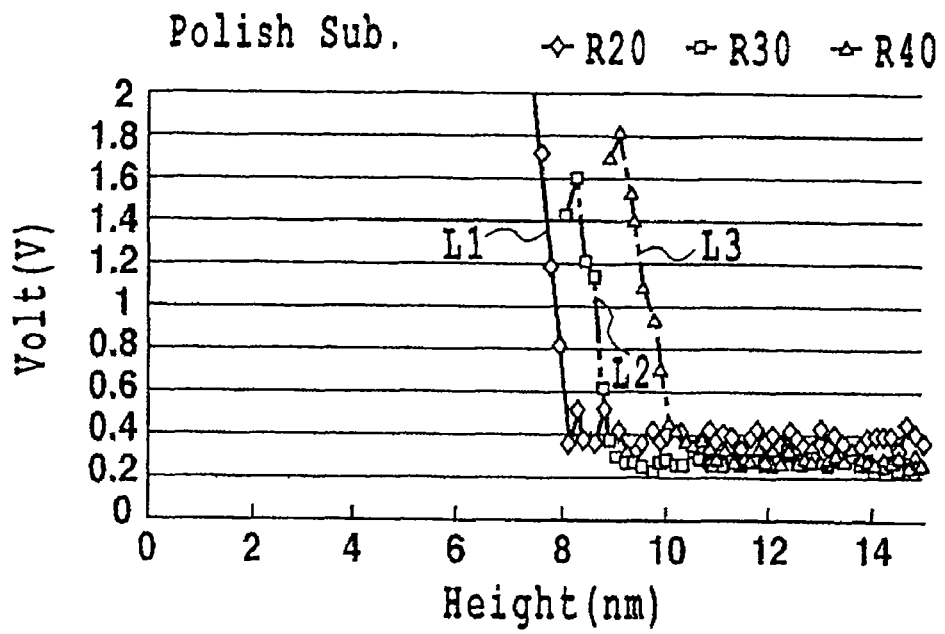
FIG. 9 shows measured values of touchdown height on perpendicular magnetic recording media of comparative examples.
Figure 10:
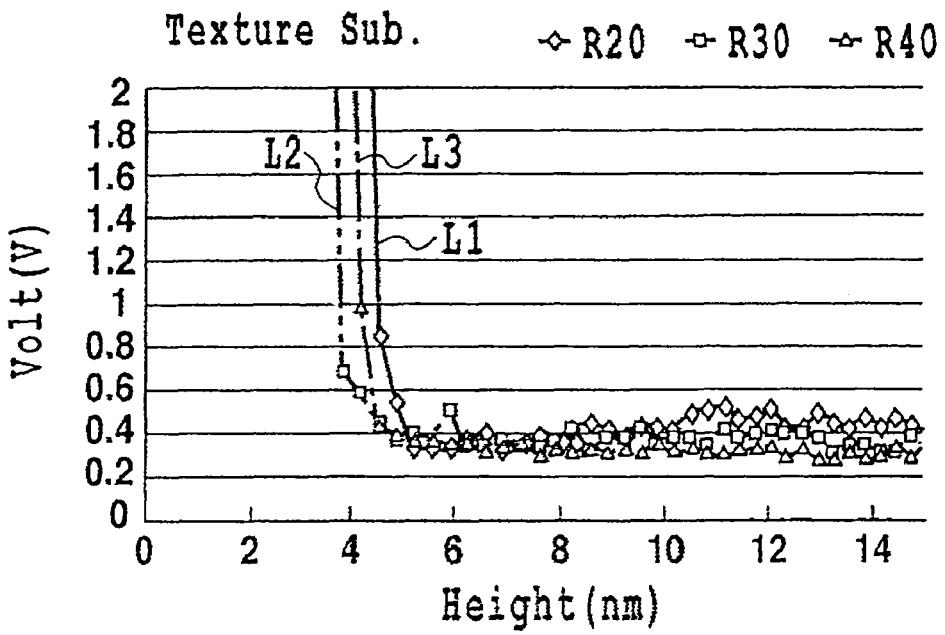
FIG. 10 shows measured values of touchdown height on perpendicular magnetic recording media of embodiment examples.

Accordingly, measurement of touch-down height was carried out on the perpendicular magnetic recording media of the comparative experimental examples studies by the inventors. FIG. 9 shows the results of touch-down height measurement on the perpendicular magnetic recording media of the comparative examples with underlayer 6 of substrate 22 on which polishing processing was solely executed and texture processing was not executed. FIG. 10 shows the results of touch-down height measurement on perpendicular magnetic recording media 10 of the embodiment examples with underlayer 6 of substrate 22 which is subjected to D processing of Example 2.

In each of the FIGS. 9 and 10, the ordinate represents the voltage from the collision signal generator and the abscissa represents the flying height (nm) of the test head. FIGS. 9 and 10 illustrate the characteristic lines L1, L2 and L3 representing touch-down height values measured at radial positions of the test head of 20 mm, 30 mm, and 40 mm, respectively.

As is clearly shown by the characteristic lines of L1, L2, and L3 in FIG. 9, the perpendicular magnetic recording media of the comparative examples generated voltage due to collision of the test head at the flying height of the test head around 8 to 10 nm. In contrast, the perpendicular magnetic recording media of the embodiment examples, as is apparent from the characteristic lines L1, L2, and L3 in FIG. 10, exhibited stable flying performance at the flying height of the test head down to 4 to 6 nm.

The results demonstrate that crash due to flaws and adhesion of a magnetic head on a recording plane of a magnetic recording medium are prevented because the step of texturing process S41 eliminates the flaws on Ni—P plating layer (underlayer) 6 generated in the step of polishing S3, and further, the following step of texture polishing S42 using the acid eliminates abnormal protrusions to form a plane having appropriate texture traces in the circumferential direction. Therefore, magnetization alignment in the vertical direction is possible while maintaining good flying performance. By making texture traces with an arithmetic mean roughness Ra of at most 0.5 nm (5 Å), preferably in the range of 0.05 nm to 0.2 nm, on substrate 22, a perpendicular magnetic recording medium can be provided that exhibits higher recording density than conventional one and improved flying performance.

Thus, a method of manufacturing a perpendicular magnetic recording medium, a method of manufacturing a substrate for a perpendicular magnetic recording medium, and a medium and a substrate manufactured by the methods have been described according to the present invention. Many modifications and variations may be made to the techniques and structures described and illustrated herein without departing from the spirit and scope of the invention. Accordingly, it should be understood that the methods and media described herein are illustrative only and are not limiting upon the scope of the invention.

DESCRIPTION OF SYMBOLS

2: nonmagnetic base plate
6: underlayer of Ni—P alloy
10: perpendicular magnetic recording medium
12: perpendicular magnetic recording layer
22: substrate
34, 36: polishing tape

What is claimed is:
1. A method of manufacturing a perpendicular magnetic recording medium comprising, in succession:
   a preliminary polishing process to smooth an underlayer made of Ni—P alloy on a substrate,
   a 2-step texturing process:
   a first texturing process using a nonwoven fabric tape and a slurry of polycrystalline diamond slurry and surfactant to form a plurality of grooves on an underlayer made of a Ni—P alloy that is on a substrate using a first polishing tape made of nonwoven fabric while supplying a first slurry that contains a surfactant and a first abrasive material; and
   a second texture polishing in which a surface of the underlayer processed by the texturing process is polished to have a surface roughness comprising texture traces that promote magnetization alignment in a vertical direction, using a second polishing tape made of a porous material while supplying a second slurry containing an acid citric, malic, maleic, phosphoric, succinic, or formic acid or a mixture thereof and colloidal silica a second abrasive material having a grain diameter smaller than a mean diameter of perforations of the second polishing tape wherein the second abrasive material is colloidal silica; and
   a sputtering process to deposit first a non-magnetic layer and then a magnetic layer on the textured surface.

2. The method of manufacturing a perpendicular magnetic recording medium according to claim 1, wherein texture polishing is carried out until the surface of the underlayer is polished to an arithmetic mean roughness Ra in the range of 0.05 nm to 0.2 nm.

3. The method of manufacturing a perpendicular magnetic recording medium according to claim 1, wherein the acid is selected from the group consisting of citric acid, maleic acid, malic acid, phosphoric acid, succinic acid, formic acid, and a mixture of these acids.

4. The method of manufacturing a perpendicular magnetic recording medium according to claim 1, wherein the second polishing tape made of a porous material is a urethane pad.

5. A method of manufacturing a substrate for a perpendicular magnetic recording medium comprising, in succession:
   a preliminary polishing process to smooth an underlayer made of Ni—P alloy on a substrate,
   a 2-step texturing process:
   a first texturing process using a nonwoven fabric tape and a slurry of polycrystalline diamond slurry and surfactant to form a plurality of grooves on an underlayer made of a Ni—P alloy that is on a substrate using a first polishing tape made of nonwoven fabric while supplying a first slurry that contains a surfactant and a first abrasive material; and
   a second texture polishing in which a surface of the underlayer processed by the texturing process is polished to have a surface roughness comprising texture traces that promote magnetization alignment in a vertical direction, using a second polishing tape made of a porous material while supplying a second slurry containing an acid citric, malic, maleic, phosphoric, succinic, or formic acid or a mixture thereof and colloidal silica a second abrasive material having a grain diameter smaller than a mean diameter of perforations of the second polishing tape wherein the second abrasive material is colloidal silica; and a sputtering process to deposit a non-magnetic layer on the textured surface.

6. The method of manufacturing a substrate for a perpendicular magnetic recording medium according to claim 5, wherein the step of texture polishing is carried out until the surface of the underlayer is polished to an arithmetic mean roughness Ra in the range of 0.05 nm to 0.2 nm.

7. The method of manufacturing a substrate for a perpendicular magnetic recording medium according to claim 5, wherein the acid is selected from the group consisting of citric acid, maleic acid, malic acid, phosphoric acid, succinic acid, formic acid, and a mixture of these acids.

8. The method of manufacturing a substrate for a perpendicular magnetic recording medium according to claim 5, wherein the second polishing tape made of a porous material is a urethane pad.

9. The method of manufacturing a perpendicular magnetic recording medium according to claim 1, wherein the first abrasive material is diamond.

10. The method of manufacturing a perpendicular magnetic recording medium according to claim 5, wherein the first abrasive material is diamond.

11. The method of manufacturing a perpendicular magnetic recording medium according to claim 1 additionally comprising, in order:

forming a soft magnetic backing layer on the NiP layer on the substrate;

forming a nonmagnetic seed layer on the soft magnetic backing layer, forming a perpendicular magnetic recording layer on the nonmagnetic seed layer, and forming a protective layer on the perpendicular magnetic recording layer.

* * * * *